United States Patent
Cranfill et al.

(10) Patent No.: US 9,355,151 B1
(45) Date of Patent: May 31, 2016

(54) SYSTEMS AND METHODS FOR ASSESSING THE SIMILARITY BETWEEN TWO NON-STANDARDIZED DATA SETS

(71) Applicant: Careerbuilder, LLC, Chicago, IL (US)

(72) Inventors: Andrew B. Cranfill, Roswell, GA (US); Jason Elliott, Roswell, GA (US)

(73) Assignee: CAREERBUILDER, LLC, Chicago, IL (US)

(*) Notice: Subject to any disclaimer, the term of this patent is extended or adjusted under 35 U.S.C. 154(b) by 439 days.

(21) Appl. No.: 13/744,715

(22) Filed: Jan. 18, 2013

Related U.S. Application Data

(63) Continuation of application No. 11/869,570, filed on Oct. 9, 2007, now Pat. No. 8,375,026, and a continuation-in-part of application No. 11/835,994, filed on Aug. 8, 2007, now Pat. No. 8,103,679, and a continuation-in-part of application No. 11/622,572, filed on Jan. 12, 2007, now abandoned.

(60) Provisional application No. 60/759,242, filed on Jan. 13, 2006.

(51) Int. Cl.
*G06F 17/30* (2006.01)

(52) U.S. Cl.
CPC ...... *G06F 17/3053* (2013.01); *G06F 17/30702* (2013.01)

(58) Field of Classification Search
CPC ................................................ G06F 17/30702
USPC .................. 707/728, 750, 804, 947, 999.005; 705/10, 321; 704/9
See application file for complete search history.

(56) References Cited

U.S. PATENT DOCUMENTS

| | | |
|---|---|---|
| 4,389,679 A | 6/1983 | Missan et al. |
| 4,654,793 A | 3/1987 | Elrod |
| 4,937,743 A | 6/1990 | Rassman et al. |
| 5,086,394 A | 2/1992 | Shapira |
| 5,111,391 A | 5/1992 | Fields et al. |
| 5,117,353 A | 5/1992 | Stipanovich et al. |
| 5,164,897 A | 11/1992 | Clark et al. |
| 5,164,899 A | 11/1992 | Sobotka et al. |
| 5,197,004 A | 3/1993 | Sobotka et al. |
| 5,243,515 A | 9/1993 | Lee |
| 5,301,105 A | 4/1994 | Cummings, Jr. |
| 5,305,195 A | 4/1994 | Murphy |
| 5,416,694 A | 5/1995 | Parrish et al. |
| 5,426,780 A | 6/1995 | Gerull et al. |
| 5,500,793 A | 3/1996 | Deming, Jr. et al. |
| 5,506,984 A | 4/1996 | Miller |

(Continued)

OTHER PUBLICATIONS

Non-Final Office Action issued on Oct. 30, 2009 with regard to U.S. Appl. No. 11/869,570.

(Continued)

*Primary Examiner* — Syling Yen
(74) *Attorney, Agent, or Firm* — Neal, Gerber & Eisenberg LLP

(57) ABSTRACT

A computer-based system and method is described for converting non-standardized resumes and job listings into standardized profiles that can be easily searched, compared and referenced. Attributes are identified within the resumes and job listings, and are evaluated for various features. Each resume or job listing is broken down into its component parts and analyzed based on a logic-based routine to identify and package meaningful content.

7 Claims, 32 Drawing Sheets

(56) References Cited

U.S. PATENT DOCUMENTS

| | | | |
|---|---|---|---|
| 5,592,375 | A | 1/1997 | Salmon et al. |
| 5,600,554 | A | 2/1997 | Williams |
| 5,671,409 | A | 9/1997 | Fatseas et al. |
| 5,758,324 | A | 5/1998 | Hartman et al. |
| 5,778,397 | A | 7/1998 | Kupiec et al. |
| 5,832,497 | A | 11/1998 | Taylor |
| 5,884,270 | A | 3/1999 | Walker et al. |
| 5,884,272 | A | 3/1999 | Walker et al. |
| 5,978,768 | A | 11/1999 | McGovern et al. |
| 5,999,939 | A | 12/1999 | de Hilser et al. |
| 6,026,403 | A | 2/2000 | Siefert |
| 6,047,327 | A | 4/2000 | Tso et al. |
| 6,266,659 | B1 | 7/2001 | Nadkarni |
| 6,370,510 | B1 | 4/2002 | McGovern et al. |
| 6,381,592 | B1 | 4/2002 | Reuning |
| 6,385,620 | B1 | 5/2002 | Kurzius et al. |
| 6,408,337 | B1 | 6/2002 | Dietz et al. |
| 6,438,539 | B1 | 8/2002 | Korolev et al. |
| 6,662,194 | B1 | 12/2003 | Joao |
| 6,691,122 | B1 | 2/2004 | Witte et al. |
| 6,728,695 | B1 | 4/2004 | Pathria et al. |
| 6,785,679 | B1 | 8/2004 | Dane et al. |
| 6,889,243 | B1 | 5/2005 | Hondou et al. |
| 6,915,295 | B2 | 7/2005 | Okamoto et al. |
| 7,139,757 | B1 | 11/2006 | Apollonsky |
| 7,191,176 | B2 | 3/2007 | McCall et al. |
| 7,490,086 | B2 | 2/2009 | Joao |
| 7,565,372 | B2 | 7/2009 | Zhang et al. |
| 7,587,395 | B2 | 9/2009 | Harney et al. |
| 7,630,986 | B1 | 12/2009 | Herz et al. |
| 7,711,573 | B1 * | 5/2010 | Obeid ............................ 705/321 |
| 8,090,725 | B1 | 1/2012 | Cranfill et al. |
| 8,103,679 | B1 | 1/2012 | Cranfill et al. |
| 8,375,026 | B1 | 2/2013 | Elliott et al. |
| 2001/0039508 | A1 | 11/2001 | Nagler et al. |
| 2001/0042000 | A1 | 11/2001 | DeFoor |
| 2002/0055870 | A1 * | 5/2002 | Thomas ............................ 705/10 |
| 2002/0059228 | A1 * | 5/2002 | McCall et al. ..................... 707/6 |
| 2004/0107192 | A1 | 6/2004 | Joao |
| 2005/0216295 | A1 | 9/2005 | Abrahamsohn |
| 2006/0271421 | A1 | 11/2006 | Steneker et al. |
| 2007/0027859 | A1 * | 2/2007 | Harney et al. ...................... 707/5 |
| 2007/0061356 | A1 | 3/2007 | Zhang et al. |
| 2007/0073678 | A1 | 3/2007 | Scott et al. |
| 2009/0125353 | A1 | 5/2009 | Bullock et al. |

OTHER PUBLICATIONS

Reuni, Stephen M., http://www.candidateseeker.com/, Aug. 21, 2005.
Peopleclick Precision Matching, A New Solutions for Online Sourcing, Peopleclick, http://peopleclick.com;solutions/rms_pm.asp, Aug. 21, 2005.
Burning Glass, Burning Glass Technologies; http://www.burning-glass.com/aboutus.html, Jul. 5, 2005.
Burning Glass, Burning Glass Technologies, http://www.burning-glass.com/intelligent.html, Jun. 29, 2005.
Think Big. Be Happy., Monster, http://about.monster.com/, Jun. 29, 2005.
Search the Web's largest collection of resumes, Hand pick just he ones you want, Monster, http://hiring.monster.com/products/resumeproducts.aspx, Oct. 7, 2005.
Solutions, Fast Search & Transfer ASA, http://www.fastsearch.com/us/solutions/, Sep. 8, 2005.
Applicant Tracking Systems 2000: A Strategic Overview and Comparison, Erepublications, Electronic Recruitign Exchange, http://www.erexchange.com/poffo/productd.asp?ProductID=%7B633CC6C5-B710-11D3-9 . . . .
What is Resumix?, http://nasastars.nasa.gov/about_NASA-STARS/what_is_resumix.htm, Sep. 6, 2005.
Hotjobs.com, Ltd. and Resumix Inc. to Merge Creates Category Leader in End-to End Online Recruiting Solutions, Source HotJobs.

com, Ltd., http://www.prnewswire.com/cgi-bin/stories.pl?ACCT=104&STORY=/www.story/04-25-20 . . . , Sep. 6, 2005.
Resumix, Put Certified Professional Resume Writers to Work for You!, CyberEdit, http://www.resumeedge.com/military/resumeadvice/resumix.shtml, Sep. 6, 2005.
Unpublished U.S. Appl. No. 09/158,452, filed Sep. 22, 1998.
Search Report dated Sep. 28, 2000 issued in PCT Patent Application No. PCT/US00/18366 (Publication No. WO01/004811).
International Preliminary Examination Report issued in PCT Patent Application No. PCT/US00/18366 (Publication No. WO01/004811) dated Aug. 2, 2008.
Burning Glass Technologies. Intelligent Search and Match. Http://www.burning-glass.com/intelligent.html, Accessed: Jul. 5, 2005, 3 pages.
Burning Glass Technologies. Resume Processing and Data Extraction. Http://www.burning-glass.com/resumeparsing.html, Accessed: Jul. 5, 2005, 3 pages.
"NetStart Teams with Competitors, ISP on Web Job Search," Newsbytes, Oct. 31, 1996, 2 pages.
"Now It's Recruiting That's Going On-Line", Electronic Engineering Times, Jan. 2, 1995, 3 pages.
"Resumix Launches Reslink Partnership with Recruiting Web Sites", Telephone IP News, Jan. 1, 1997, 2 pages.
"My Careersite", Printed from Careersite.com, Jan. 22, 2000, 3 pages.
Careerbuilder. Major Media Companies Unveil New Affiliated Online Career Model—The CareerBuilder Network, Business Wire, May 1998. P5191119. pp. 1-4.
Intellimatch, Website redesigned & personalized services for job seekers & employers expanded, Dec. 1996.
"ResLink Product Summary," from Resumix web site (www.resumix.com), Jan. 4, 1997, 1 page.
"ResLink Software Product Brief," from Resumix web site (www.resumix.com), Jan. 4, 1997, 3 pages.
"ResLink Announces ResLink," from Resumix web site (www.resumix.com), Jan. 4, 1997, 5 pages.
"Reslink Partners," from Resumix web site (www.resumix.com), Jan. 4, 1997, 3 pages.
"The Monster Board," from Monster.com web site (www.monster.com), Mar. 17, 1997, 4 pages.
"NetStart Delivers TeamBuilder Online, The First Browser-Based Recruiting Application to Accelerate the Hiring Process," CareerBuilder press release, Dec. 8, 1997, 5 pp.
"NetStart Unveils TeamBuilder 2.0," CareerBuilder press release, Jun. 23, 1997, 3 pp.
La Ganga et al. "O.C. Job Firms and College Career Centers Link Websurfers to Employment," Los Angeles Times Orange County Edition, Mar. 21, 1997, 2 pp.
Ross, "Employee Recruiting Goes Electronic," St. Louis Dispatch, Apr. 21, 1997, 2 pp.
"Job Hunting in Cyberspace," The Wall Street Journal, Sep. 1, 1995, 2 pp.
Website address www.monsterboard.com, Feb. 1999.
Website address www.occ.com, Feb. 22, 1999.
Website address www.bestrecruit.com, Feb. 22, 1999.
Website address www.resumix.com, Feb. 22, 1999.
Website address www.corpsites.com, Dec. 8, 1998.
Website address www.hotjobs.com, 1999.
Website address www.careermosaic.com, Feb. 22, 1999.
Website address www.futurestep.com, Feb. 22, 1999.
Website address www.easysabre.com, Feb. 22, 1999.
Clyde et al. An Object Oriented Implementation of an Adaptive Classification of Job Openings, IEEE, pp. 9-16, Feb. 1995.
Belanger et al. Employment Interview Information Available Online, vol. 10, No. 1, Online Reviews, pp. 45-56, Feb. 1986.
Dolan et al. Top US Sources for an Online Job, Database, pp. 35-43, Nov. 1994.
Martin L. Ramsay, The USA at your Fingertips, p. 89, Jun. 1993.
Eric R. Chabrow, Online Employment, pp. 38-40, Jan. 1995.
APS Related Information, pp. 3-2, 3-3, 4-3, 4-4, 4-12, 4-26, 4-31, 4-32, 4-36.
Harry Newton, Resume: Resume Announces Internet Services, Work-Group Computing, pp. 1-3, Jun. 1995.

(56) References Cited

OTHER PUBLICATIONS

Riley, Resume Databases on the Internet, The Riley Guide, pp. 1-5, 1995.
MCI Communications Corpoation, "MCI, Job and resumes posting related information".
Sullivan, Kristina B., Vendors to Push Multimedia Wares at CD ROMs Show (PC Week) Oct. 1991, p. 28.
Website address www.joboptions.com, 1999.
Website address www.headhunternet.com, 1999.
Website address www.careerpath.com, Oct. 22, 1999.
Website address www.dice.com, 1999.
Website address www.careerweb.com, Oct. 26, 1999.
Website address www.nationjob.com, Oct. 22, 1999.
Saftner, TJ; Get Net-smart: The electronic resume; Career World (Dialog file 484, 03529457); v26 n2, p. 28-31, Oct. 1997.
McGee, Marianne Kolbasuk; Help wanted: Find it online. Jobtrak is just one new service making both job hunting and recruitment easier; InformationWeek; n531 p. 84, Jun. 12, 1995.
Overman, Stephenie; Crusing cyberspace for the best recruits; HRMagazine (Dialog file 15,0094293); v40n2, p. 52-55, Feb. 1995.
Kennedy, Joyce Lain; The job search goes computer; Journal of Career Planning Employment (Dialog file 484, 02186415) v55 nl, p. 42-46, Fall 1994.
Goff, "Job Surfing!," Computerworld, Sep. 2, 1996, v30, n36, 2pp.
Raeder, "Job search sites on the web," Searcher, Jun. 1997, v5, n6, 6pp.
Anonymous, "Recruiters' Internet Survival Guide," HRHMagazine, Dec. 1996, v41, n12, 1p.
Roche, "Case a wide net for talent," Datamation, Sep. 1997, v43, n9, 2pp.
"Feature/Heart's job hosting service simplifies management of job listings on multiple on-line recruiting sites," Business Wire, Jun. 9, 1997, 1p.
Ojala, "Recruiting on the Internet," Online, Mar./Apr. 1997, v21, n2, 6pp.
Goldstein, "Get a job," Successful Meetings, Feb. 1997, v46, n2, 2pp.
Meyer, "EZaccess: An industrial-strength recruiting system," HRHMagazine, Apr. 1997, v42, n4, 3pp.
Starcke, "Software bits," HRMagazine, Apr. 1997, v42, n4, 2pp.
Flynn, "Pop Quiz: How do you recruit the best college grads?," Personnel Journal Survival Guide for Recruitment Supplement, Aug. 1995, 6 pp.
"Resumix Creates World's Largest Virtual Job Market: Launches ResLink Partnership with Nine Recruiting Web Sites," Business Wire, Dec. 19, 1996, 2 pages.
Freeman, Diane, "Job seekers, employers turn to Internet job banks," Northern Colorado Business Report, v3, n12, Sep. 1998, 3 pages.
"Resumix announces free software for internet recruiting; Manager's Workbench integrates Resumix with the internet . . . ," Business Wire, Jun. 10, 1996, 2 pages.
"Yahoo joins Resumix ® Reslink™ Partners Program . . . ," PR Newswire, Mar. 3, 1997, 2 pages.
"CareerSite.com registers 35,000 Internet Job Seekers," PR Newswire, Oct. 28, 1996, 2 pages.
"Former Micrografx CEO and Proctor & Gamble Veteran Gordon M. Tucker . . . ," PR Newswire, Sep. 19, 1996, 2 pages.
Crispin et al., "Recruiting rockets through syberspace," HRMagazine, v42, n12, Dec. 1997, 4 pages.
Pack, "Directories to online job listings," Link-Up, v14, n3, May/Jun. 1997, 3 pages.
Brown, Jim, "Managing your career online," Network World, v14, n11, Mar. 17, 1997, 2 pages.
Kennedy, Shirley, "Need a New Job? Get to work on the Web," Information Today, v3, n7, Jul./Aug. 1996, 4 pages.
Talbott, Shannon Peters, "How to recruit online," Personnel Journal, Mar. 1996, 4 pages.
Bellinger, Robert, "On any given day, up to 50,000 sites post one or more opening . . . ," Electronic Engineering News, May 5, 1997, 3 pages.
Kaplan, "Thousands of college grads nationwide sought by employers on-line," Business Wire, Apr. 17, 1997, 2 pages.
Heacox, Stephanie, "Information job hunting through the Internet," Searcher, v4, n3, Mar. 1996, 7 pages.
Parker, Clara H., "Job-shopping Web-Style . . . ," DMBS, v10, n1, Jan. 1997, 5 pages.

\* cited by examiner

Job Posting

Web Developer ⟶ 62

Our client, located in Atlanta, GA, is seeking a Web Developer. The Web Developer is responsible for designing and delivering business applications for intranet, extranet, and internet sites using Microsoft .NET technologies in the BEA Aqualogic Interaction (formerly Plumtree) portal. Understand business and technical requirements and then delivers appropriate end-to-end solutions consisting of component-based, services-oriented applications developed using the .NET Framework and the BEA Aqualogic Interaction application suite.

Additionally, in this role you must understand, analyze, and document technical environment and business requirements. Participate in the development and delivery of web portal solutions by estimating, planning, designing, and implementing portal-based composite applications. Provide guidance and direction regarding SOA, Web Services, and .NET development standards, policies, and best practices. Develop web service based integrations with existing enterprise applications and systems. Perform technology/tools evaluation and software technical proofs of concept.

⟩ 64

Prerequisites include:
Bachelor's degree in Computer Science, related field or equivalent experience.
Five years experience with web technologies including portal software, content management, and development in HTML, ASP, and fourth-generation software languages.
MCD or MCSD certifications preferred.
2 + years of experience with Microsoft's .NET framework and development environment including, but not limited to, C# ASP.NET and XML.
Knowledge of the .NET XML class libraries.
4 + years of experience with classic ASP development environment and scripting.
4 + years of experience with SQL language and light-duty database management with Microsoft SQL Server.

| | Resume 75 |
|---|---|
| Title | Attorney/Software Developer |
| Text | I am an attorney/software developer who has designed, written and been selling and supporting legal practice software applications for corporate/securities/transactional paralegals and attorneys.... |
| | In the past few months, I have completed development.... |
| | I set high standards for myself in designing and developing legal software applications.... |
| | SUMMARY OF QUALIFICATIONS<br>- Skilled software developer with extensive experience....<br>- Successful software vendor....<br>- Experienced corporate/securities attorney responsible for....<br>- Strong analytical, organizational, written and verbal skills.<br>- Expert in Word, Excel, Internet and Microsoft Visual Basic.... |
| | WORK EXPERIENCE<br>1990-Present Software Designer/Developer/Sole Proprietor<br>ABC Corporation, Chicago<br>- Designed, wrote, tested, marketed, sold and continuously supported and maintained The Software Program....<br>-Developed and wrote The Automated Software, which generated all of the organizational documents necessary for state corporations. |
| | 1985-90 Attorney, Corporate and Securities Law<br>ABC Law Firm P.C., Chicago<br>-Represented various startup companies in raising initial capital through the private or public sale of limited partnership interests.<br>-Drafted numerous agreements and other documents in connection with a wide variety of general corporate transactions.<br>-Researched various securities, corporate and tax law issues, and dealt with federal and state securities administrators and other corporate law administrators regarding such issues. |
| | 1984-85 Attorney, Tax Law, XYZ Company, Dallas<br>-Researched tax law issues and processed annual tax returns. |
| | EDUCATION<br>University of ABC School of Law, J.D., 1984<br>Publication: |
| | University of XYZ, B.B.A., High Distinction, 1981<br>Major: Accounting<br>Concentrations: Calculus, Economics and Finance |
| | PROFESSIONAL LICENSES<br>Admitted to State Bar in 1987.<br>Received CPA certificate. |
| | INTERESTS<br>Music, Football, Skiing, Movies |
| CB Keywords | Finance / Information Technology / Consultant / Professional Services / Legal |

FIG. 4

Band Array

| Band | Text | Description |
|---|---|---|
| 0 | Attorney/Software Developer | Resume title |
| 1 | i am an attorney/software developer who has designed, written and been selling and supporting legal practice software applications for corporate/securities/ transactional paralegals and attorneys.... in the past few months, i have completed development.... i set high standards for myself in designing and developing legal software applications.... summary of qualifications - skilled software developer with extensive experience.... successful software vendor.... experienced corporate/ securities attorney responsible for.... strong analytical, organizational, written and verbal skills. - expert in word, excel, internet and microsoft visual basic. | The first band is the first block of text we find that isn't preceded by a date range (ie 1981-2005 I worked for abc company). This first block of text is generally a summery of an individual and their skills. We consider this to be an important band, and is therefore scored highly. |
| 2 | work experience 1990 -present software designer/ developer/sole proprietor ABC corporation, chicago - designed, wrote, tested, marketed, sold and continuously supported and maintained the software program. - developed and wrote the automated software, which generated all of the organizational documents necessary for corporations. | This band is the first block of text where we found a date range. In this case: "1980-present". These date ranges indicate work experience and places of employment, and generally contain important keywords and skills used for the timeframe, therefore they are scored in order from most recent to oldest. |
| 3 | 1985-90 attorney, corporate and securities ABCD Law Firm, chicago - represented various startup companies in raising initial capital through the private or public sale of limited partnership interests. - drafted numerous agreements and other documents in connection with a wide variety of general corporate transactions. - researched various securities, corporate and tax law issues, and dealt with federal and state securities administrators and other corporate law administrators regarding such issues. | Date range block of text. "1985-90" |
| 4 | 1984-85 attorney, tax law, XY & company, dallas - researched tax law issues and processed annual tax returns. education university of ABC school of law, j.d., 1984 publication; university of XYZ, b.b.a., high distinction, 1981 major: accounting concentrations: calculus, economics and finance professional licenses admitted to state bar in 1984. received cpa certificate. | Date range block of text. "1984-85" |

FIG. 5A

| | | |
|---|---|---|
| 5 | | Empty band separates resume form cb keywords. This band is only for developers to separate a resume from CB keywords. 92f |
| 6 | Finance / Information Technology / Consultant / Professional Services / Legal  ⌐83 | CB Keywords. These are manually added by CB employees to help resumes perform better on our site. We consider these to be helpful, especially in low content documents, but since a CB employee added them, they are scored the lowest. 92g |

FIG. 5B

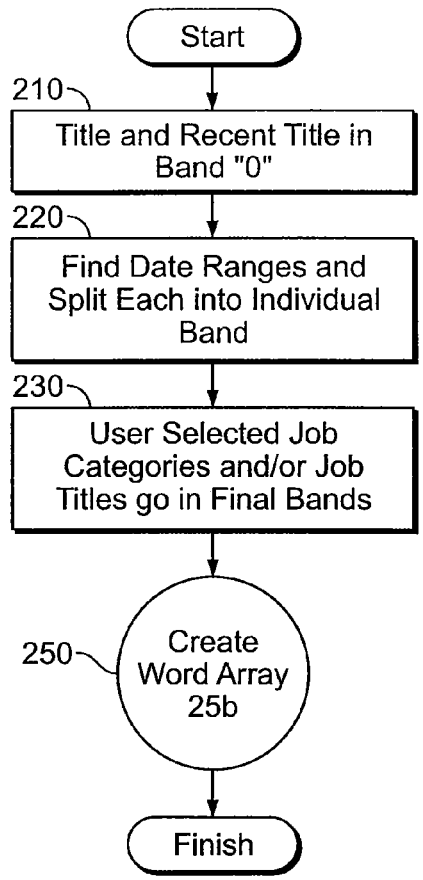

FIG. 6

Word Array 25b → 92

| Word | Band |
|---|---|
| attorney/software | 0 |
| attorney | 0 |
| software | 0 |
| developer | 0 |
| i | 1 |
| am | 1 |
| an | 1 |
| attorney/software | 1 |
| attorney | 1 |
| software | 1 |
| developer | 1 |
| who | 1 |
| has | 1 |
| designed | 1 |
| written | 1 |
| and | 1 |
| been | 1 |
| selling | 1 |
| and | 1 |
| supporting | 1 |
| legal | 1 |
| practice | 1 |
| software | 1 |
| applications | 1 |
| for | 1 |
| corporate/securities/transactional | 1 |
| corporate | 1 |
| securities | 1 |
| transactional | 1 |
| paralegals | 1 |
| and | 1 |
| attorneys | 1 |
| for | 1 |
| * * * * | |
| work | 2 |
| experience | 2 |

96a → attorney/software; 96b → attorney; 96c → software

Labels on right: 2, 6, 7

FIG. 7A

| | |
|---|---|
| present | 2 |
| software | 2 |
| designer/developer/sole | 2 |
| designer | 2 |
| developer | 2 |
| sole | 2 |
| proprietor | 2 |
| ABC | 2 |
| corporation | 2 |
| chicago | 2 |
| designed | 2 |
| wrote | 2 |
| tested | 2 |
| marketed | 2 |
| sold | 2 |
| and | 2 |
| continuously | 2 |
| supported | 2 |
| and | 2 |
| maintained | 2 |
| the | 2 |
| Software | 2 |
| Program | 2 |
| * * * * | |
| and | 2 |
| iowa | 2 |
| corporations | 2 |
| attorney | 3 |
| corporate | 3 |
| and | 3 |
| securities | 3 |
| law | 3 |
| ABCD | 3 |
| Lawfirm | 3 |
| p.c | 3 |

FIG. 7B

| | |
|---|---|
| chicago | 3 |
| represented | 3 |
| various | 3 |
| startup | 3 |
| companies | 3 |
| in | 3 |
| raising | 3 |
| initial | 3 |
| capital | 3 |
| through | 3 |
| the | 3 |
| private | 3 |
| or | 3 |
| public | 3 |
| sale | 3 |
| of | 3 |
| limited | 3 |
| partnership | 3 |
| interests | 3 |
| * * * * | |
| attorney | 4 |
| tax | 4 |
| law | 4 |
| X | 4 |
| Y | 4 |
| company | 4 |
| dallas | 4 |
| researched | 4 |
| tax | 4 |
| law | 4 |
| issues | 4 |
| and | 4 |
| processed | 4 |
| annual | 4 |
| tax | 4 |
| returns | 4 |
| education | 4 |
| university | 4 |

FIG. 7C

| | |
|---|---|
| of | 4 |
| ABC | 4 |
| school | 4 |
| of | 4 |
| law | 4 |
| j.d | 4 |
| * * * * | |
| logical | 4 |
| framework | 4 |
| finance | 6 |
| information | 6 |
| technology | 6 |
| consultant | 6 |
| professional | 6 |
| services | 6 |
| legal | 6 |

Original Substitute

| | |
|---|---|
| ap | accounts payable |
| ar | accounts receivable |
| acctg | accounting |
| ad | advertising |
| admin | administrative |
| adv | advertise |
| agcy | agency |
| agt | agent |
| ap | accounts payable |
| approx | approximately |
| appt | appointment |
| ar | accounts receivable |
| assn | association |
| assoc | associate |
| asst | assistant |
| atty | attorney |
| bkkpg | bookkeeping |
| bkkpr | bookkeeper |
| bldg | building |
| bus | business |
| capt | captain |
| cpa | certified public accountant |
| dept | department |
| dir | director |
| dist | district |
| dp | data processing |
| elec | electric |
| eng | engineer |
| equip | equipment |
| exam | examination |
| exch | exchange |
| exec | executive |
| exp | experience |
| fact | factory |
| govt | government |
| grad | graduate |
| h.s. | high school |
| hosp | hospital |
| intl | international |
| it | information technology |

Common Words

| | | | | | |
|---|---|---|---|---|---|
| believe | N | build | N | changes | N |
| believed | N | buildings | N | charge | Y |
| below | N | built | N | charged | Y |
| beneath | N | business | Y | charles | N |
| benefit | Y | busy | N | check | N |
| berlin | N | but | N | chicago | N |
| beside | N | buy | N | chief | Y |
| besides | N | by | N | china | N |
| best | N | california | N | choice | N |
| better | N | call | Y | chosen | N |
| between | N | called | N | christ | N |
| beyond | N | calling | Y | churches | N |
| bible | N | calls | N | circle | N |
| big | N | came | N | circumstances | N |
| bill | Y | camp | N | cities | N |
| billion | N | can | N | citizens | N |
| birds | N | can't | N | city | N |
| birth | N | cannot | N | class | N |
| bit | Y | capable | N | classes | N |
| black | N | capacity | Y | clean | Y |
| block | N | care | Y | clear | Y |
| blue | N | career | Y | clearly | Y |
| board | N | careful | N | close | N |
| bodies | N | carefully | N | closed | Y |
| body | N | carried | N | closely | N |
| born | N | carry | N | closer | Y |
| boston | N | carrying | N | clothes | N |
| both | N | cars | Y | coast | Y |
| bottle | N | case | N | cold | Y |
| bottom | N | cases | N | color | N |
| bought | N | caught | N | column | N |
| box | N | cause | N | combination | Y |
| boy | N | caused | N | come | N |
| boys | N | causes | N | comes | N |
| break | N | cell | Y | coming | N |
| bridge | N | cells | Y | command | Y |
| brief | N | cent | N | common | N |
| bring | N | center | Y | communism | N |
| britain | N | central | Y | communist | N |

FIG. 11

Attribute Dictionary

| Attribute ID | Attribute | Independent/Dependent Attribute (Concept Or Title) | Synonym Attribute ID |
|---|---|---|---|
| 804685 | .net | C | 804685 |
| 2604159 | .net framework | C | 2604159 |
| * | * | * | * |
| * | * | * | * |
| * | * | * | * |
| 300739 | a+ | C | 104166 |
| 101433 | a+ certification | C | 104166 |
| 104166 | a+ certified | C | 104166 |
| 5849185 | a/c | C | 5849185 |
| 5853473 | a/p | C | 301252 |
| 5846935 | a/r | C | 301222 |
| 301874 | aa | C | 301874 |
| 5805034 | aami | c | 5805034 |
| 801270 | aap | C | 801270 |
| * | * | * | * |
| * | * | * | * |
| * | * | * | * |
| 5804574 | acceptance | c | 5804574 |
| 103610 | acceptance testing | C | 103610 |
| 300137 | access | CD | 300137 |
| * | * | * | * |
| * | * | * | * |
| * | * | * | * |
| 308123 | accommodation | C | 308123 |
| 5805115 | account | CD | 5805115 |
| 304394 | account analysis | C | 304394 |
| 102496 | account development | C | 102496 |
| 301469 | account management | C | 301469 |
| 101780 | account reconciliation | C | 101780 |
| 804854 | account strategies | C | 804854 |
| 804878 | accountability | C | 804878 |
| 701552 | accountancy | C | 100347 |
| 5000090 | accountant | S | 5000090 |
| 5804845 | accounted | c | 5804845 |
| 100347 | accounting | C | 100347 |
| * | * | * | * |
| * | * | * | * |
| * | * | * | * |
| 5001843 | administrator | D | 5001843 |
| 308966 | admission | C | 308966 |
| 804261 | admit financial | C | 804261 |
| * | * | * | * |
| * | * | * | * |
| * | * | * | * |
| 5000077 | advisor | D | 5000077 |

FIG. 12

Attribute Array 25c

| Attribute | Band | Occurrences | Support |
|---|---|---|---|
| *Titles* | | | |
| Attorney | 0 | 13 | 3 |
| Paralegal | 1 | 2 | 3 |
| Software developer | 0 | 6 | 0 |
| Attorney software developer | 0 | 2 | 0 |
| Legal practitioner | 1 | 2 | 0 |
| Transactional paralegal | 1 | 2 | 0 |
| Practitioner | 1 | 2 | 0 |
| Securities transactional paralegal | 1 | 2 | 0 |
| Securities attorney | 1 | 1 | 0 |
| Corporate securities attorney | 1 | 1 | 0 |
| Skill software developer | 1 | 1 | 0 |
| Designer | 2 | 1 | 0 |
| Designer developer | 2 | 1 | 0 |
| Accountant | 4 | 1 | 5 |
| Technology consultant | 6 | 2 | 2 |
| Corporate law administrator | 3 | 1 | 0 |
| Securities administrator | 3 | 1 | 0 |
| Law administrator | 3 | 1 | 0 |
| Certified public accountant | 4 | 1 | 4 |
| Public accountant | 4 | 1 | 4 |
| Information technology consultant | 6 | 1 | 1 |
| *Concepts* | | | |
| Legal | 1 | 9 | 6 |
| Law | 1 | 7 | 4 |
| Attorney software | 0 | 4 | 0 |
| Developer software | 0 | 2 | 0 |
| Research | 1 | 3 | 1 |
| Internet | 1 | 1 | 2 |
| Regulatory | 1 | 1 | 0 |
| Corporate | 1 | 9 | 5 |
| Vendor | 1 | 1 | 2 |
| Investment | 2 | 1 | 5 |
| Tax | 3 | 4 | 6 |
| Finance | 4 | 2 | 3 |
| Federal | 2 | 2 | 2 |
| Securities | 1 | 8 | 2 |
| Corporate securities | 1 | 6 | 0 |
| Transactional | 1 | 2 | 3 |
| Transaction | 1 | 3 | 1 |

FIG. 13A

| | | | | ⁐7 |
|---|---|---|---|---|
| Software application | 1 | 4 | 0 | |
| Securities transactional | 1 | 4 | 0 | |
| Legal software | 1 | 4 | 0 | |
| Development process | 1 | 2 | 0 | |
| Organizational | 1 | 2 | 0 | |
| Application development | 1 | 2 | 0 | |
| Skill software | 1 | 2 | 0 | |
| Legal application | 1 | 2 | 0 | |
| Legal software application | 1 | 2 | 0 | |
| Software vendor | 1 | 2 | 0 | |
| Analyze law | 1 | 2 | 0 | |
| Corporate securities transactional | 1 | 2 | 0 | |
| Design software | 1 | 2 | 0 | |
| Microsoft visual | 1 | 2 | 0 | |
| Drafting | 1 | 1 | 1 | |
| Draft | 3 | 1 | 2 | |
| Macros | 1 | 1 | 1 | |
| Vba | 1 | 1 | 1 | |
| Financing | 1 | 1 | 1 | |
| Analyze | 1 | 1 | 1 | |
| Analytical | 1 | 1 | 1 | |
| * * * * | | | | |
| Capital | 3 | 1 | 2 | |
| Automated | 2 | 2 | 1 | |
| Automate | 2 | 2 | 1 | |
| Federal compliance | 2 | 2 | 0 | |
| Software program | 2 | 2 | 0 | |
| Registration | 2 | 1 | 0 | |
| Software automated | 2 | 1 | 0 | |
| Book | 2 | 1 | 0 | |
| Automated corporate | 2 | 1 | 0 | |
| Sky | 2 | 1 | 0 | |
| Software program automate | 2 | 1 | 0 | |
| Program automate | 2 | 1 | 0 | |
| Federal compliance process | 2 | 1 | 0 | |
| Compliance process | 2 | 1 | 0 | |

FIG. 13B

| | | | |
|---|---|---|---|
| Test | 2 | 1 | 0 |
| Accounting | 4 | 2 | 5 |
| Connection | 3 | 1 | 1 |
| Tax law | 3 | 3 | 0 |
| Corporate law | 3 | 2 | 0 |
| Corporate transaction | 3 | 1 | 0 |
| Commodity pool | 3 | 1 | 0 |
| Estate | 3 | 1 | 0 |
| Real estate | 3 | 1 | 0 |
| Securities law | 3 | 1 | 0 |
| Private | 3 | 1 | 0 |
| Oil | 3 | 1 | 0 |
| Commodity | 3 | 1 | 0 |
| Pool | 3 | 1 | 0 |
| Gas | 3 | 1 | 0 |
| Oil gas | 3 | 1 | 0 |
| Economic | 4 | 1 | 2 |
| Finance professional | 4 | 2 | 0 |
| Certified public | 4 | 2 | 0 |
| Research tax | 4 | 2 | 0 |
| Process annual | 4 | 2 | 0 |
| Framework | 4 | 1 | 0 |
| Bar | 4 | 1 | 0 |
| Logical | 4 | 1 | 0 |
| Securities act | 4 | 1 | 0 |
| Research tax law | 4 | 1 | 0 |
| Finance professional license | 4 | 1 | 0 |
| Annual tax | 4 | 1 | 0 |
| Process annual tax | 4 | 1 | 0 |
| Logical framework | 4 | 1 | 0 |
| Professional license | 4 | 1 | 0 |
| License | 4 | 1 | 0 |
| Professional service | 6 | 2 | 0 |
| Consultant professional | 6 | 2 | 0 |
| Finance information | 6 | 2 | 0 |
| Information technology | 6 | 2 | 0 |
| Professional service legal | 6 | 1 | 0 |
| Service legal | 6 | 1 | 0 |
| Consultant professional service | 6 | 1 | 0 |
| Finance information technology | 6 | 1 | 0 |
| Technology consultant professional | 6 | 1 | 0 |

FIG. 13C

125a → POD

| Root Title | | | Leaf Title | Root -> Leaf % | Leaf -> Root % | Para % | Sent % | Docs with Root | Docs with Leaf | Docs with Both |
|---|---|---|---|---|---|---|---|---|---|---|
| accountant | | | staff accountant | 15.71 | 100.14 | 91.84 | 91.84 | 4577 | 718 | 719 |
| accountant | | | public accountant | 49.88 | 100.09 | 70.34 | 70.34 | 4577 | 2281 | 2283 |
| accountant | certified | | public accountant | 49.49 | 100.09 | 62.22 | 62.27 | 4577 | 2263 | 2265 |
| accountant | | | tax accountant | 4.50 | 99.52 | 74.18 | 75.16 | 4577 | 207 | 206 |
| accountant | | | fund accountant | 2.29 | 100.00 | 69.19 | 73.43 | 4577 | 105 | 105 |
| accountant | | | management accountant | 1.62 | 100.00 | 66.67 | 73.33 | 4577 | 74 | 74 |
| accountant | | | financial accountant | 1.01 | 100.00 | 64.71 | 66.67 | 4577 | 46 | 46 |
| accountant | | | senior accountant | 13.74 | 99.84 | 56.41 | 47.64 | 4577 | 630 | 629 |
| accountant | | | junior accountant | 6.07 | 100.00 | 62.90 | 45.88 | 4577 | 278 | 278 |
| accountant | | | certified | 54.16 | 24.40 | 62.27 | 62.27 | 4577 | 10161 | 2479 |
| accountant | | | tax consultant | 1.16 | 63.10 | 66.67 | 66.67 | 4577 | 84 | 53 |
| accountant | | | public | 57.66 | 22.09 | 56.41 | 56.41 | 4577 | 11949 | 2639 |
| accountant | | | account | 58.12 | 13.58 | 60.24 | 56.04 | 4577 | 19582 | 2660 |
| accountant | | | corporate accounts receivable | 33.14 | 28.22 | 63.43 | 61.45 | 4577 | 5375 | 1517 |
| accountant | | | accountant | 1.59 | 100.00 | 40.57 | 40.57 | 4577 | 73 | 73 |
| accountant | | | accounting | 86.61 | 25.53 | 33.96 | 27.63 | 4577 | 15529 | 3964 |
| accountant | | | accounts payable | 36.75 | 29.02 | 53.21 | 53.94 | 4577 | 5796 | 1682 |
| accountant | | | payable | 40.29 | 27.63 | 51.38 | 51.15 | 4577 | 6674 | 1844 |
| accountant | | | cpa | 11.58 | 82.68 | 36.47 | 33.73 | 4577 | 641 | 530 |
| accountant | | | accounting | 92.59 | 15.33 | 28.49 | 20.35 | 4577 | 27642 | 4238 |
| accountant | | | gaap | 9.55 | 76.00 | 36.26 | 29.51 | 4577 | 575 | 437 |
| accountant | | | sales tax | 5.79 | 65.27 | 46.30 | 31.61 | 4577 | 406 | 256 |
| accountant | | | receivable | 19.20 | 38.84 | 44.00 | 45.11 | 4577 | 2263 | 879 |
| accountant | | | tribal balance | 4.30 | 64.17 | 47.66 | 30.97 | 4577 | 307 | 197 |

| | | | | |
|---|---|---|---|---|
| 17 c++ program | 2, 96.00 | 1, 8, 0.00 | 4, 81.82, 25.82 | 49.67 85.40 |
| 18 software_system | 2, 96.00 | 1, 14, 0.00 | 4, 88.38, 27.89 | 49.22 84.00 |
| 19 medical_device_company | 2, 96.00 | 1, 1, 0.00 | 6, 29.26, 9.23 | 49.73 96.20 |
| 20 device_company | 2, 96.00 | 1, 1, 0.00 | 5, 26.89, 8.49 | 49.71 96.20 |
| 21 configurate_manage | 2, 96.00 | 1, 5, 0.00 | 10, 78.25, 24.69 | 48.55 78.60 |
| 22 perl | 2, 96.00 | 1, 12, 0.00 | 10, 92.83, 29.29 | 44.62 76.60 |
| 23 placement_position | 2, 96.00 | 1, 28, 0.00 | 12, 117.19, 36.98 | 47.77 65.60 |
| 24 contract_compensation | 2, 96.00 | 1, 7, 0.00 | 8, 62.21, 19.63 | 46.95 74.20 |
| 25 electrical_computer | 2, 96.00 | 1, 1, 0.00 | | 50.00 89.80 |
| 26 tcp | 2, 96.00 | 1, 6, 0.00 | 7, 55.36, 17.47 | 41.63 79.80 |
| 27 design_program | 2, 96.00 | 1, 1, 0.00 | | 49.70 86.40 |
| 28 uml_model | 2, 96.00 | 1, 3, 0.00 | | 50.00 81.80 |
| 29 manage_tool | 2, 96.00 | 1, 1, 0.00 | 2, 12.86, 4.06 | 49.09 77.80 |
| 30 tcp_network | 2, 96.00 | 1, 2, 0.00 | | 49.69 79.40 |
| 31 firmware | 10, 0.00 | 1, 39, 0.00 | 23, 289.65, 91.40 | 47.71 46.20 |
| 32 software_design | 10, 0.00 | 1, 39, 0.00 | 26, 227.09, 71.66 | 47.48 45.20 |
| 33 peoplesoft | 10, 0.00 | 1, 6, 0.00 | 1, 3.34, 1.05 | 44.39 46.00 |
| 34 embedded_control | 2, 96.00 | -1, 0, 0.00 | | 50.00 92.40 |
| 35 electrical_engineer_computer | 2, 96.00 | -1, 0, 0.00 | | 50.00 89.60 |
| 36 engineer_computer | 2, 96.00 | -1, 0, 0.00 | | 50.00 89.60 |
| 37 computer_engineer_science | 2, 96.00 | -1, 0, 0.00 | | 50.00 89.40 |
| 38 engineer_computer_science | 2, 96.00 | -1, 0, 0.00 | | 50.00 89.40 |
| 39 engineer_science | 2, 96.00 | -1, 0, 0.00 | | 49.85 89.40 |
| 40 real-time_software | 2, 96.00 | -1, 0, 0.00 | | 49.85 84.20 |
| 41 real-time_software_system | 2, 96.00 | -1, 0, 0.00 | | 50.00 84.00 |
| 42 multi_thread_environment | 2, 96.00 | -1, 0, 0.00 | | 50.00 83.20 |
| 43 thread_environment | 2, 96.00 | -1, 0, 0.00 | | 50.00 83.20 |
| 44 developer_uml | 2, 96.00 | -1, 0, 0.00 | | 50.00 82.00 |
| 45 developer_uml_model | 2, 96.00 | -1, 0, 0.00 | | 50.00 81.80 |
| 46 device_experience | 2, 96.00 | -1, 0, 0.00 | | 50.00 81.00 |
| 47 tcp_network_experience | 2, 96.00 | -1, 0, 0.00 | | 50.00 79.20 |
| 48 network_experience | 2, 96.00 | -1, 0, 0.00 | | 49.65 79.20 |
| 49 requirement_manage | 2, 96.00 | -1, 0, 0.00 | | 49.87 78.00 |
| 50 requirement_manage_tool | 2, 96.00 | -1, 0, 0.00 | | 50.00 77.80 |

FIG. 20B

Pond: 36 37 38
software engineer <--band--> 38
requirement qualification() 
skill requirement:
c++, 37
embedded c program,
software engineer, 36
uml <--band-->
purpose: 43 43 37
a large medical device company (in the greater milwaukee metro area is looking for a software development engineer,
that has experience with embedded control. 45
candidates will need the following:
<--line--> requirement:
<--empty--> bs or ms in electrical (engineer/computer) (engineer/computer) science <--empty--> experience with all aspects of sw lifecycle <--empty--> 3+ years of (c/object-oriented) (design/c++)
program <--empty--> 3+ years of embedded software development <--line--> <--empty--> experience with real-time software system in a multi thread environment <--line-->
preference:
<--empty--> experience developer uml model <--line--> <--empty--> medical device experience <--empty--> unix program experience <--line--> <--empty--> (udp/tcp/ip) network experience
<--empty--> clearcase configurate manage <--empty--> doors requirement manage tool experience <--line--> <--empty--> scripting language <--empty--> <--empty--> perl ,
csh ,
etc <--empty--> 6 sigma dfss greenbelt certification <--line--> classification :
<--line--> contract <--line--> compensation :
$59 to $60 <--line--> join aerotek cesm ,
one of the lead providers of (engineer/engineer) support professional in north america
due to our growth ,
we' ;
re constantly on the lookout for qualified professional to place in contract ,
contract to hire ,
and permanent placement position across a number of different industry .
we know it' ;
s more than just day to day responsibilities that can make or break a job ,
it' ;
s the support you get.
that' ;
s the reason aerotek ce offers a variety of benefit including medical ,
dental ,
optical ,
401k ,
and many more .
don' ;
t put your career in the hand of just anyone ,
put it in the hand of a specialist .
join the aerotek ce team !

FIG. 20C allegis (group/its) subsidiaries are equal opportunity employer .
<--band-->
<--line--> <--band-->
<--line--> <--band-->
<--line--> <--band-->
<--line--> <--band-->
<--line--> <--band-->
<--line--> <--band-->
<--line--> <--band-->
analyst,
computer,
database engineer,
db,
dba system,
developer,
firmware,
peoplesoft developer,
developer,
software design engineer,
software developer,
software development engineer,
software engineer <--band-->

Pods :
29. rp=3534,ta=315.5665868874723:software_engineer, ce_team, c++, computer_science, software engineer, engineer_support, development_engineer, peoplesoft_developer, ce, configurate_manage, uml, firmware, EL_MS, multi_thread, perl, embedded_software, program_experience, database_engineer, software_development_engineer, design_engineer, computer_engineer, software_development, electrical_engineer, software_system, JL_mld, software_design, software_design_engineer, dba, software_developer, experience_software_development, lead_engineer, mainframe, technical_consultant, technology_executive_company, mysql, internet_development, c#, j2ee_developer, requirement_skill, cs, xsl, test_case, precision_specification, web_base_application, leader_categorical, software_test_engineer, application_development, cmmi, software_test, j2ee, web_server, vb.net, informatica, iis, aix, integration_test, crystal_report, software_product, vb, quality_assurance_engineer, oracle, microprocessor, senior_engineer, team_sizing, net_framework, test_executive, development_lifecycle, c++_developer, ms_sql, css, asp.net, computer_software , sql_developer, software_quality_assurance, system_development, edp_open, system_developer, ms_sql_server, telecom_recruit, JL_senior, doom, rtos, senior_software, oracle_database, technical_leader, dollar_service, system_integration, engineer_categorical, engineer_experience, development_life_cycle, ejb, xml, engineer_developer, application_engineer, relational_database, application_server, rvs, linux, web_designer, gui, cs, mq, fortran, ant, business_intelligence, system_software_engineer, word_format, degree_computer_science, cvs, java, operating_system, signal_process, corba, unix, api, developer_analyst, java_beans, weblogic, hardware_open, .net, dsp, cgi, cics, experience_java, cop, information_consultant, program_language, db2, software_engineer_developer, bachelor_engineer, test_tool, system_analysis, full_job_title, regression_test, microsoft, sql, bug, shell, avionic, web_base, cobol, store_procedure, ado.net, definity, experience_software, device_driver, websphere, vbscript, bea, eclipse, information_technology, application_developer, mri, asp, t-sql, tomcat, web_development, high_caliber, solaris, clearcase, contact_detailer, database_design, unit_test, oracle_developer, j2ee_technology, object_orientation_design, jdbc, software_architect, system_engineer, data_warehousing, system_design, multiplatform_system_integration, developer_categorical, soa, assembly_language, development_experience, software_engineer_categorical, php, test_engineer, software_development_experience, degree_computer, graduate_computer, experience_developer, shell_script, system_administrator, system_architecture, senior_developer, sybase, web_developer, middleware,

FIG. 20D

Band 0
base_application, oo, ms access, design_pattern, senior_software_developer, data_structural, java_developer, jcl, technical_lead, swing, computer_developer, team_technical_leader, technology_executive, xslt, sdlc, visual_basic, visual_c++, technical_leader_categorical, technical_professional, ood, hp-ux, c#.net, tibco, development_team, project_leader, network_protocol, sql_server, ado, embedded_system, team_lead, oracle_sql, electronic_engineer, development_tool, orientation_design, lead_developer, senior_system_engineer, snmp, science_engineer, system_analyst, etl, web_application, winrunner, developer_software, test_director, python, microsoft_visual, development_life, intel, apache, hardware_engineer, system_test, edp, junit, premiere_technology, jsp, senior_system, javascript, system_software, html, software_quality, client_server, life_cycle, design_developer, test_procedure, unix_shell_script, vhdl, executive_company, cmm, sei, rational_rose, urgent_open, web_service, servlet, ui, vxworks, script_language, cmmi_level, team_developer, EL_BS, jms, .net_developer, skill_set, support_engineer, senior_software_engineer, database_developer, java_script, soap, application_architect, dhtml, bsee, gsm, unix_shell, vba, mfc, embedded_software_engineer, vc++, software_developer_categorical, dollar_service_company, software_application, system_architect, team_technical, team_leader, object_orientation, user_interface, data_warehouse, hardware_design, software_consultant, experience_design, premiere_technology_executive, real_time, rdbms, multiplatform_system, relation_discipline, veritas, visual_studio, cmm_level,

Band 1
Software Engineer

Band 1
required qualifications:
*skills requirements:*
c++, embedded c programming, software engineer, uml

Band 2
purpose:
a large medical device company in the greater milwaukee metro area is looking for a software development engineer, that has experience with embedded controls. candidates will need the following: required: - bs or ms in electrical engineering/computer engineering/computer science - experience with all aspects of sw lifecycle - 3+ years of c/object-oriented design and c++ programming - 3+ years of embedded software development - experience with real-time software systems in a multi-threaded environment preferred: - experience developing uml models - medical device experience - unix programming experience - udp and tcp/ip networking experience - clearcase configuration management - doors requirement management tools experience - scripting languages - perl, csh, etc - 6-sigma dfss greenbelt certified
classification:
contract
compensation:
$59 to $60 join aerotek cesm, one of the leading providers of engineering and engineering support professionals in north america. due to our growth, we're constantly on the lookout for qualified professionals to place in contract, contract-to-hire, and permanent placement positions across a number of different industries. we know it's more than just your day-to-day responsibilities that can make or break a job. it's the support you get. that's the reason aerotek ce offers a variety of benefits including medical, dental, optical, 401k, and many more. don't put your career in the hands of just anyone, put it in the hands of a specialist. join the aerotek ce team! allegis group and its subsidiaries are equal opportunity employers.

Band 3

Band 10
analyst, computer, database engineer, db, dba systems, developer, firmware, peoplesoft developer, programmer, software design engineer, software developer, software development engineer, software engineer

FIG. 20E

Job Level: JL_mid (Entry: 1 Senior: 1 Exec: 0) - concepts: (0,0,0) manage: (-1,+1,+0) HS only: (+2,+0,+0)
Education Level: EL_HS
Best Score: 24.03 (Avg of top 80 results.)

Titles:

| R | Word | Band | Occ | Sprt | Cmn | Pos |
|---|---|---|---|---|---|---|
| 1 | voluntary_worker | 0, 150.00 | 2, 0, 100.00 | | 50.00 | 99.00 |
| 2 | machine_operator | 1, 66.67 | 1, 34, 0.00 | 1, 16.53, 33.16 | 36.12 | 79.40 |
| 3 | contractor_worker | 1, 66.67 | -1, 0, 0.00 | | 50.00 | 86.60 |

Pond:
asseamble ,
voluntary worker <--band-->
ave .
phone number        <--line-->
    <--line--> ct ,
. .    objective to obtain a position based @ my professional skill .
education june 2003 new britain high school new britain ,
ct <--line--> professional march 2006 the dynamic group ltd .
new britain ,
ct <--line-->    manager    <--line--> experience <--line-->
contractor worker paint ○
ruffling ,
clean solvents ,
oil ,
paint .
coat or other foreign <--line--> material .
<--line-->
august 2004 pack all inc .
<--line-->
beacon falls ,
ct <--line-->
asseamble ,
voluntary worker pack ,
(shipping/receivable) , Concepts:

| R | Word | Band | Occ | Sprt | Cmn | Pos |
|---|---|---|---|---|---|---|
| 1 | oil | 1, 66.67 | 1, 54, 0.00 | 2, 49, 87, 100.00 | 40.16 | 85.60 |
| 2 | landscape | 1, 66.67 | 1, 38, 0.00 | 1, 33, 33, 66.84 | 45.39 | 78.00 |
| 3 | high_school | 1, 66.67 | 1, 44, 0.00 | 3, 37, 50, 75.19 | 0.65 | 91.80 |
| 4 | position_base | 1, 66.67 | 1, 1, 0.00 | | 50.00 | 94.00 |
| 5 | bilingual_spanish | 1, 66.67 | 1, 5, 0.00 | | 44.91 | 74.40 |
| 6 | construction | 3, 0.00 | 1, 53, 0.00 | 3, 21, 32, 42.76 | 13.11 | 71.60 |
| 7 | professional_skill | 1, 66.67 | -1, 0, 0.00 | | 49.08 | 93.20 |
| 8 | dynamic_group | 1, 66.67 | -1, 0, 0.00 | | 50.00 | 89.80 |
| 9 | worker_paint | 1, 66.67 | -1, 0, 0.00 | | 50.00 | 86.40 |
| 10 | contractor_worker_paint | 1, 66.67 | -1, 0, 0.00 | | 50.00 | 86.40 |
| 11 | foreign_material | 1, 66.67 | -1, 0, 0.00 | | 50.00 | 84.20 |
| 12 | worker_pack | 1, 66.67 | -1, 0, 0.00 | | 50.00 | 80.60 |
| 13 | voluntary_worker_pack | 1, 66.67 | -1, 0, 0.00 | | 50.00 | 80.60 |
| 14 | worker_cut | 1, 66.67 | -1, 0, 0.00 | | 50.00 | 76.20 |
| 15 | language_bilingual | 1, 66.67 | -1, 0, 0.00 | | 49.85 | 74.60 |
| 16 | language_bilingual_spanish | 1, 66.67 | -1, 0, 0.00 | | 50.00 | 74.40 |

FIG. 21

My Job Recommendations

View All Fresh Jobs (↑) (↓) (+) (−) (✕)
PRIORITY  NO. of JOBS  HIDE

US: Roswell, GA 30075 (Default)

15 jobs found that match this section, (No. of Jobs Requested: 15)

| Job Title | Company | Location | Freshness | Closeness | Relevance | Date | |
|---|---|---|---|---|---|---|---|
| Senior Software Engineer | Witness Systems, Inc | Roswell, GA | | | | 03/12 | Similar Jobs |
| Applications Consultant | Witness Systems, Inc | Roswell, GA | | | | 03/19 | Similar Jobs |
| Web Developer | Adecco Technical | Roswell, GA | | | | 03/15 | Similar Jobs |
| Software Engineer® NEW! | Northridge Systems | Roswell, GA | | | | 03/20 | Similar Jobs |
| Workflow Systems Engineer | SNAPS, Inc. | Roswell, GA | | | | 03/07 | Similar Jobs |
| VB.NET / C# Developer | MATRIX Resources, Inc. | Roswell, GA | | | | 02/28 | Similar Jobs |
| JD Edwards OneWorld - Senior Programmer Analyst | MizunoUSA | Norcross, GA | | | | 03/16 | Similar Jobs |
| Consulting Software Engineer | Siemens Energy & Automation | Norcross, GA | | | | 03/19 | Similar Jobs |
| Senior .NET Software Developer/ Lead Developer | Advectis | Alpharetta, GA | | | | 03/13 | Similar Jobs |
| Senior Software Engineer | Pencom Systems Incorporated | Alpharetta, GA | | | | 03/19 | Similar Jobs |
| Senior Engineer/ Architect | | Alpharetta, GA | | | | 03/09 | Similar Jobs |
| Business Analyst | The Martin Silver Group | Alpharetta, GA | | | | 03/14 | Similar Jobs |
| Senior Software Engineer (Java) | Principle Solutions Group | Alpharetta, GA | | | | 03/05 | Similar Jobs |
| Senior Consultant | Dynamics Talent | Alpharetta, GA | | | | 03/05 | Similar Jobs |
| Java/J2EE Developer | Remx IT Staffing | Alpharetta, GA | | | | 03/19 | Similar Jobs |

View All Close Jobs (↑) (↓) (+) (−) (✕)
PRIORITY  NO. of JOBS  HIDE 20 jobs found that match this section, (No. of jobs Requested: 20)

| Job Title | Company | Location | Freshness | Closeness | Relevance | Date | |
|---|---|---|---|---|---|---|---|
| Programmer® NEW ! | Think Energy Group | Cateraville, GA | | | | 03/21 | Similar Jobs |
| Sr. .NET Developer | Curtis 1000 | Duluth, GA | | | | 02/28 | Similar Jobs |
| .NET Developer | TEKsystems | Atlanta, GA | | | | 03/16 | Similar Jobs |
| .Net Developer | 3i People, Inc. | Atlanta, GA | | | | 03/18 | Similar Jobs |
| .Net Web Applications Developer | CareerBuilder, LLC | Norcross, GA | | | | 03/09 | Similar Jobs |
| ASP.NET Developer | MATRIX Resources, Inc | Atlanta, GA | | | | 03/14 | Similar Jobs |
| Software Engineer Sr. | Digital Insight an Intuit Company | Norcross, GA | | | | 02/27 | Similar Jobs |
| SharePoint Specialists | Idea infeocation | Atlanta, GA | | | | 02/28 | Similar Jobs |
| Software Engineer | | Duluth, GA | | | | 03/16 | Similar Jobs |
| Software Engineer | CareerBuilder, LLC | Norcross, GA | | | | 03/14 | Similar Jobs |
| VB.NET / C# Developer® | MATRIX Resources, Inc | Roswell, GA | | | | 03/28 | Similar Jobs |

FIG. 22B

SYSTEMS AND METHODS FOR ASSESSING THE SIMILARITY BETWEEN TWO NON-STANDARDIZED DATA SETS

CROSS-REFERENCE

This application is a continuation of U.S. patent application Ser. No. 11/869,570, filed on Oct. 9, 2007, which is a continuation-in-part of U.S. patent application Ser. No. 11/835,994, filed on Aug. 8, 2007, now U.S. Pat. No. 8,103,679 which issued on Jan. 24, 2012, which is a continuation-in-part of U.S. patent application Ser. No. 11/622,572 filed on Jan. 12, 2007, which is a non-provisional patent application of U.S. patent application Ser. No. 60/759,242 filed on Jan. 13, 2006. These prior applications are incorporated herein in their entirety by reference.

BACKGROUND OF THE INVENTION

This invention relates generally to a method and system for receiving a plurality of non-standardized data sets and generating respective standardized profiles 80 that can be used for efficiently comparing and matching the data sets.

One application for the current invention is providing online recruiting services, and more specifically, for converting job seekers' resumes on the one hand and job postings on the other hand into standardized profiles, which can be compared and matched to one another. Conventional online recruiting systems permit employers to create job posting for available positions and permit job seekers to post their resumes. Conventional online recruiting systems have also permitted job seekers to browse or conduct keywords searches through available job postings and submit their resumes for specific jobs. Conversely, these systems have also permitted employers to browse or conduct keyword searches through available candidate resumes. However, the task of browsing for candidate resumes or job postings is time consuming and can be a hit-or-miss proposition for both the job seeker and the employer. While conducting targeted keyword searches may reduce the total number of job postings or resumes, the only way to find the most suitable match is to review and evaluate each resume or job posting individually.

SUMMARY OF THE INVENTION

A system and method is described for receiving a plurality of non-standardized data sets and generating respective standardized profiles that can be used for efficiently comparing and matching the data sets. One application of this invention is to convert job seekers' resumes and job postings into respective standardized profiles and then ranking the standardized profiles according to their suitability for a particular job posting. Generally, the system includes a remote computer, which is connected to a server computer via a network system or the Internet and which is capable of exchanging files and information with the server computer.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF DRAWINGS

For a better understanding of the invention, reference may be had to the following Appendices, which further describe a preferred embodiment of the present invention and which include drawings and exemplary screen shots therefore:

FIG. 2 is a sample graphical user interface of one screen employed by the present invention.

FIG. 3 illustrates an exemplary data set in the form of a job posting.

FIG. 4 illustrates an exemplary data set in the form of a candidate resume.

FIG. 5A-5B illustrates an illustrative band array generated from the data set shown in FIG. 4.

FIG. 6 illustrates the steps for parsing a data set into bands.

FIGS. 7A-7D illustrate an illustrative word array generated from the data set shown in FIG. 4.

FIG. 9 illustrates an excerpt of a substitute database, as used in the present invention.

FIG. 11 depicts an excerpt from the common word database as used in the present invention.

FIG. 12 illustrates an excerpt of the attribute dictionary, as used in the present invention.

FIGS. 13A-13C illustrate an exemplary attribute array generated from the data set shown in FIG. 4 according to the present invention.

FIG. 15 illustrates an excerpt from an exemplary pod, as used in the present invention.

Figure 20A:
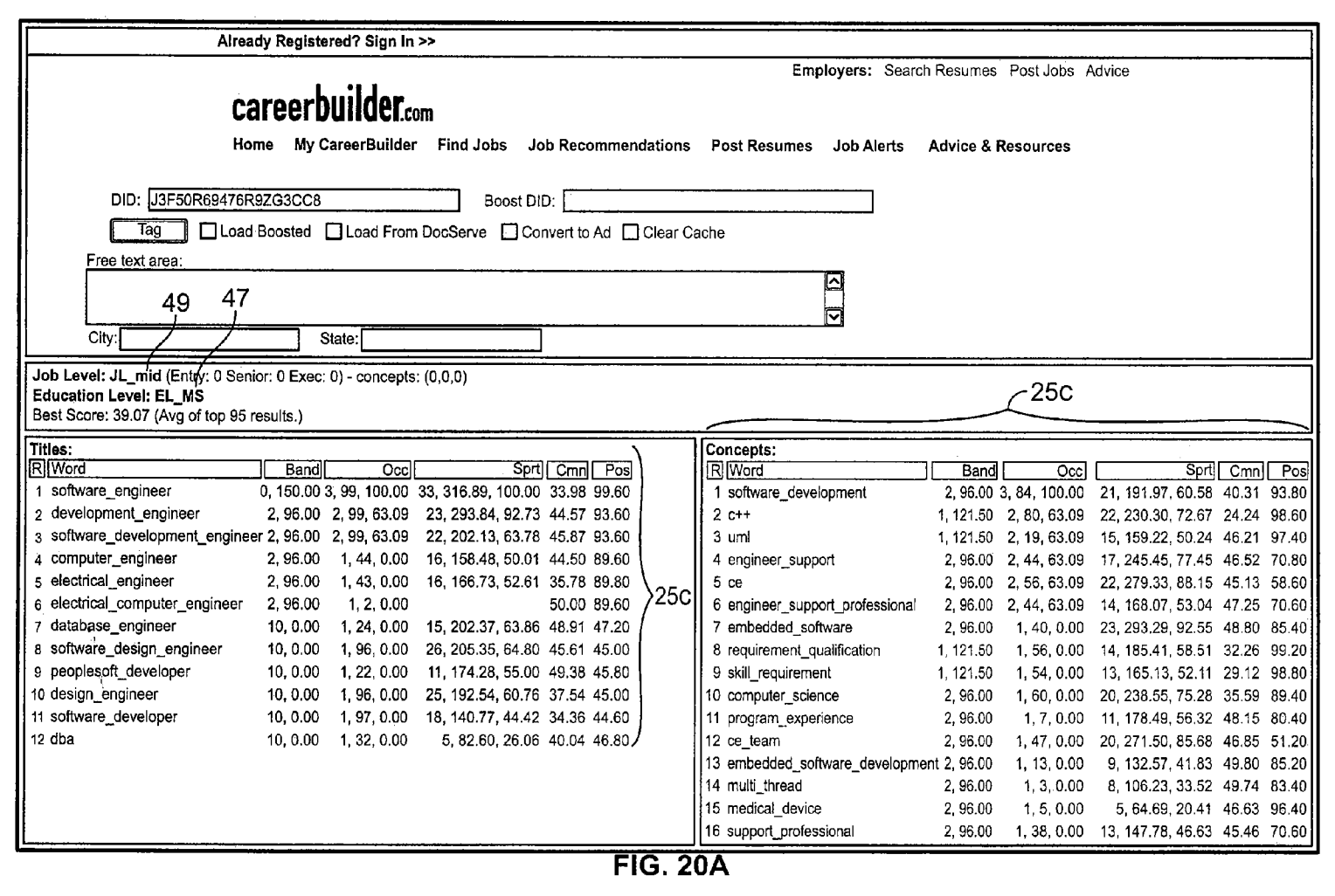

FIGS. 20A-20E illustrate an exemplary tagged job posting featuring an embodiment employing the pond, job level, and education level.

FIG. 21 illustrates an exemplary tagged resume featuring an embodiment employing the pond, job level, and education level.

FIG. 22A-22B illustrate any exemplary recommendation page featuring dynamic pods corresponding to a profile.

DETAILED DESCRIPTION

Figure 1:
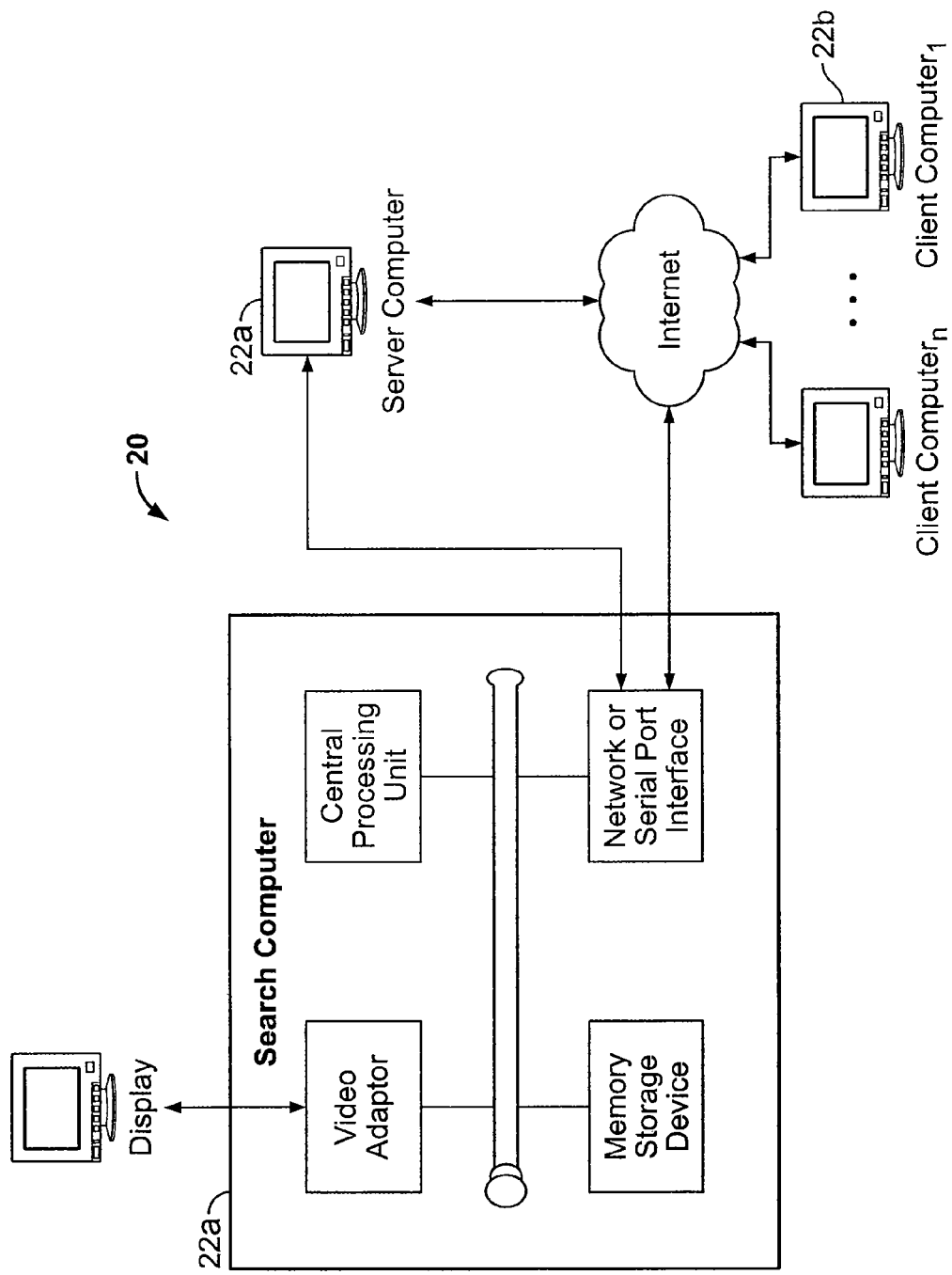
FIG. 1 is a diagram depicting a computer network on which an embodiment of the invention may be operated.

Turning now to the Figures, wherein like reference numerals refer to like elements, there is illustrated a system and method for receiving a plurality of non-standardized data sets and generating respective standardized profiles 80 that can be used for efficiently comparing and matching the data sets. The system permits users to use the standardized profiles 80 to compare and match various data sets.

As will be described, each data set is processed to (A) parse the data set into bands 92; (B) identify attributes 70a, 70b, 70c, etc., such as concepts 85 or titles 87 related to the data set; (C) identify the band 92 in which each attribute 70 is first found; (D) identify the number of occurrences 108 in which each attribute is associated with each data set; and (E) identify what support 140 is present in the rest of each data set for each attribute 70. The results provided in an array 25c can then be weighted to create a profile 80. For example, all of the attributes 70*a*, 70*b*, 70*c*, etc. can be ranked depending on one or more metrics 90*a*, 90*b*, 90*c*, etc., which are described herein. The metrics 90*a*, 90*b*, 90*c*, etc. may include band 92, occurrences 108, support 140 or various combinations of all three metrics.

The System

Although not required, the system and method will be described in the general context of a computer network 20, as is well know in the industry, and computer executable instructions being executed by general purpose computing devices within the computer network 20. Referring to FIG. 1, in this regard, the general purpose computing devices may comprise one or more server computers 22*a* hosting a data set software application. If there are multiple server computers 22*a*, they may interface via a network or serial interface either directly or over the Internet or other local or wide area network. The server computer 22*a* can also include one or more databases for storing data sets. Data sets can include resume information, job-posting information, personal profile information, housing information, or any other data sets for which it would be advantageous to compare one data set against other data sets to select appropriate matches. In the context of recruiting services, data sets may include (1) detailed information about a prospective applicant, such as, previous job history, experience, education, and job-search criteria, or (2) information about an employer or possible job posting, such as, hiring criteria, educational and skill qualifications, location, and employee benefits. It should be appreciated that the network components could be described as having client and server relationships, as generally known in the art.

To allow each user having a client computer 22*b* to access and utilize the data matching system, the software application will reside on the server computer(s) 22*a*. Further, it is preferable that client users access the software application via an internet browser, which acts as an interface between the software application and the operating system for the server computer 22*a*. The operating system for the server computer 22*a* and the client computer 22*b* may be Windows®-based or could employ any one of the currently existing operating systems, such as LINUX®, MAC OS®, Mozilla®, etc. In addition, it should be appreciated by those with skill in the art that other applications besides the browser may also be utilized to act as an interface between the software application and the server computers 22*a*.

Figure 2:
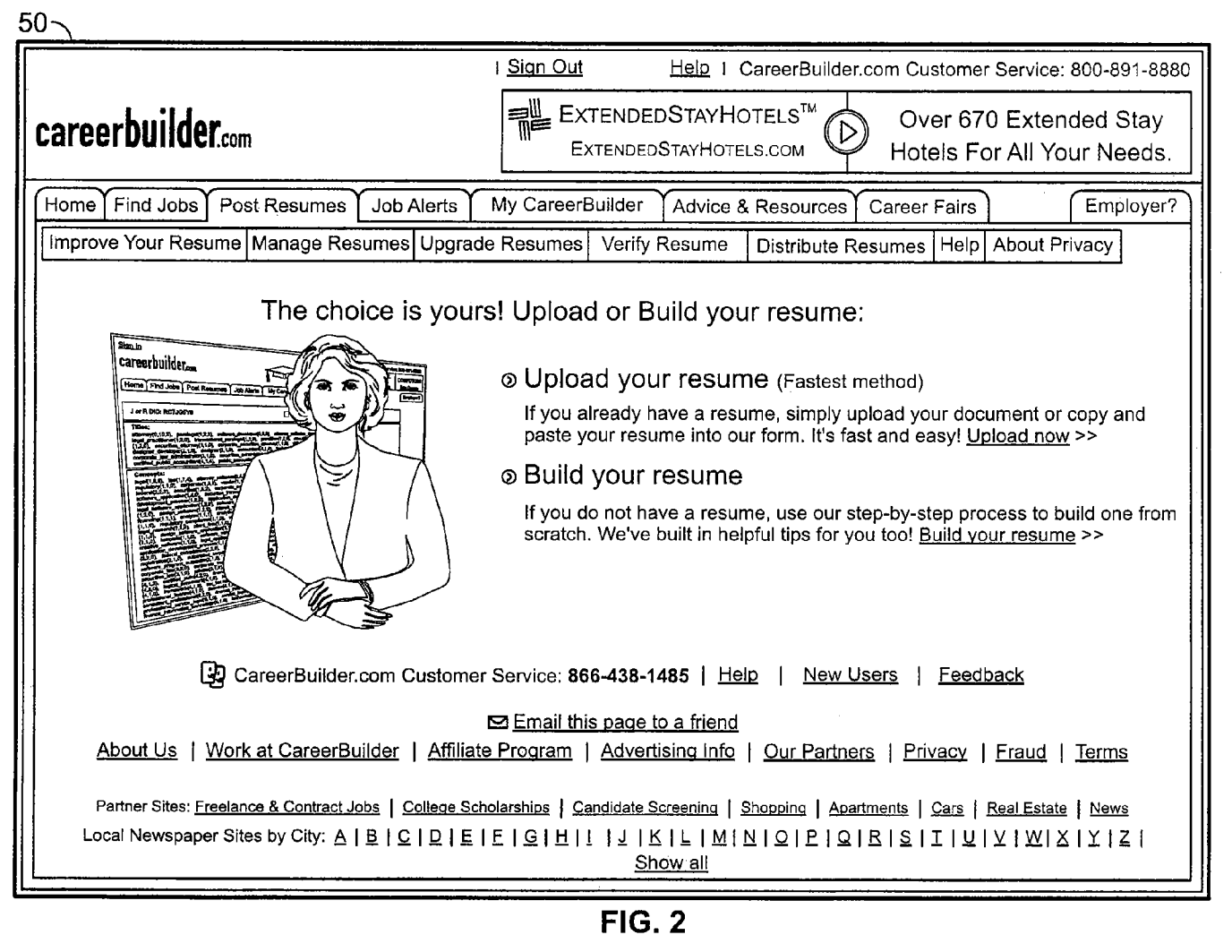

For editing, populating and maintaining the databases, the browser includes a graphical user interface 50. As shown in FIG. 2, the graphical user interface 50 is further comprised of various menu bars, drop-down menus, buttons and display windows.

As will be appreciated by those of skill in the art, the computers 22*a*, 22*b* need not be limited to personal computers, but may include hand-held devices, multiprocessor systems, microprocessor-based or programmable consumer electronics, minicomputers, mainframe computers, personal digital assistants, cellular telephones or the like depending upon their intended end use within the system. For performing the procedures described hereinafter, the computer executable instructions may be written as routines, programs, objects, components, and/or data structures that perform particular tasks. Within the computer network 20, the computer executable instructions may reside on a single computer 22, a server computer 22*a*, a client computer 22*b*, or the tasks performed by the computer executable instructions may be distributed among any combination of those computers 22, 22*a*, 22*b*. Therefore, while described in the context of a computer network, it should also be understood that the present invention may be embodied in a stand-alone, general purpose computing device that need not be connected to a network.

To efficiently provide users with access to the software application 30, the server computers 22*a* and the underlying framework for the computer network 20 may be provided by the service company itself or by outsourcing the hosting to an application service provider ("ASP"). ASP's are companies that provide server computers that store and run a software application on behalf of a third party, which is accessible to that party's users via the Internet or similar means. Therefore, companies are able to provide a computer network without supplying the server computer(s) 22*a*. In addition, users are able to access and use software applications without storing the software application on their computers. It should be understood, however, that ASP models are well-known in the industry and should not be viewed as a limitation with respect to the type of system architectures that are capable of providing a computer network 20 that can properly operate the software application discussed herein. Similarly, a provider of the system may also choose to host the system on its own equipment or employ a third-party hosting service to maintain the system.

To perform the particular tasks in accordance with the computer executable instructions, the computers 22*a*, 22*b* may include, as needed, a video adapter, a processing unit, a system memory, and a system bus that couples the system memory to the processing unit. The video adapter allows the computers 22*a*, 22*b* to support a display, such as a cathode ray tube ("CRT"), a liquid crystal display ("LCD"), a flat screen monitor, a touch screen monitor or similar means for displaying textual and graphical data to a user. The display allows a user to view information, such as, code, file directories, error logs, execution logs and graphical user interface tools.

The computers 22*a*, 22*b* may further include read only memory (ROM), a hard disk drive for reading from and writing to a hard disk, a magnetic disk drive for reading from and writing to a magnetic disk, and/or an optical disk drive for reading from and writing to a removable optical disk or any other suitable data storage device. The hard disk drive, magnetic disk drive, optical disk drive or other data storage device may be connected to the system bus by a hard disk drive interface, a magnetic disk drive interface, or an optical disk drive interface, respectively, or other suitable data interface. The drives and their associated computer-readable media provide a means of non-volatile storage for the computer executable instructions and any other data structures, program modules, databases, arrays, etc. utilized during the operation of the computers 22*a*, 22*b*.

To connect the computers 22*a*, 22*b* within the computer network 20, the computers 22*a*, 22*b* may include a network interface or adapter. For example, used in a wide area network, such as the Internet, the computers 22*a*, 22*b* typically include a modem, router or similar device. The modem, which may be internal or external, may be connected to the system bus via a serial port interface. It will be appreciated that the described network connections are exemplary and that other means of establishing a communications link between the computers 22*a*, 22*b* may be used. For example, the system may also include a wireless access interface that receives and transmits information via a wireless communications medium, such as a cellular communications network, a satellite communications network, or another similar type of wireless network. It should also be appreciated that the network interface will be capable of employing TCP/IP, FTP, SFTP, Telnet SSH, HTTP, SHTTP, RSH, REXEC, etc. and other network connectivity protocols.

As mentioned above, in one embodiment, the software application 30 and databases reside on the server computer(s) 22a and are managed by the provider of the software application 30 or by a third-party. Those with skill in the art will understand, however, that the software application and databases may reside on the remote client computer 22b and be managed and maintained by a user. The graphical user interface 50 may load web pages via HTTP or HTTPS or other suitable application protocol.

For populating the databases, the browser may be utilized, but this may also be accomplished via an MS-SQL Server Enterprise Manager. While the software application 30 may be programmed in any software language capable of producing the desired functionality, it is envisioned that the software application will be programmed using Microsoft ASP.net, HTML, Javascript, PHP3, or MS-SQL Stored Procedures.

For maintaining the security associated with the software application and databases, a unique login page may be maintained for each user including, for example, individuals and employers. The login page may also be used to control the access privileges for various levels of users. In addition, each login page may also require a user name and password. For security purposes, the user names and passwords may be kept separately for each company that is accessing the software application. To gain access to the software application, the user must enter the proper user name and password. It should be appreciated that different login procedures may be employed, which are well know in the industry, on an as-needed basis.

To maintain edit, populate and maintain the databases, the graphical user interface 50 allows the user to perform standard text editing functions, including, mouse placement of the cursor, click-and-drag text selection and standard Windows® key combinations for cutting, copying and pasting data. In addition, the graphical user interface 50 allows users to access, copy, save, export or send data or files by using standard Windows® file transfer functions. It should be understood that these editing and file transfer functions may also be accomplished within other operating system environments, such as LINUX®, MAC OS®, UNIX, Mozilla®, etc.

Data Sets

While the system can be used for any application in which it would be desirable to compare non-standardized data sets, the following description applies the system in the context of employment recruiting and job searching. As shown in FIG. 3, job posting 61 for a Web Developer is an exemplary data set, which typically provides a title 62, job description 64, and the criteria 66 for the job posting 61, including the type and level of education, professional credentials, and experience that a qualified job seeker should possess. As will be described in greater detail below, from each of these pieces of information, the system can generate an attribute. In this example, job posting 61 calls for a job seeker with, among other things, a bachelors degree in computer science and experience in development in HTML and ASP.

Similarly, a resume 71 represents another data set that comprises information about a job seeker. FIG. 4 provides an illustrative resume 71 for an individual seeking position as a software developer. Information about a job seeker may include, for example, professional objectives 72, qualifications 73, levels of education 74, past and present job titles and experience 76, and personal interests 78. As described below, the system may optionally permit a user to input her last job title 75 and offer pre-defined categories from which the user can select. The title 75 and categories can then be associated in the data set. As with job postings 61, the system can generate one or more attributes from each of these pieces of information.

Figure 17:
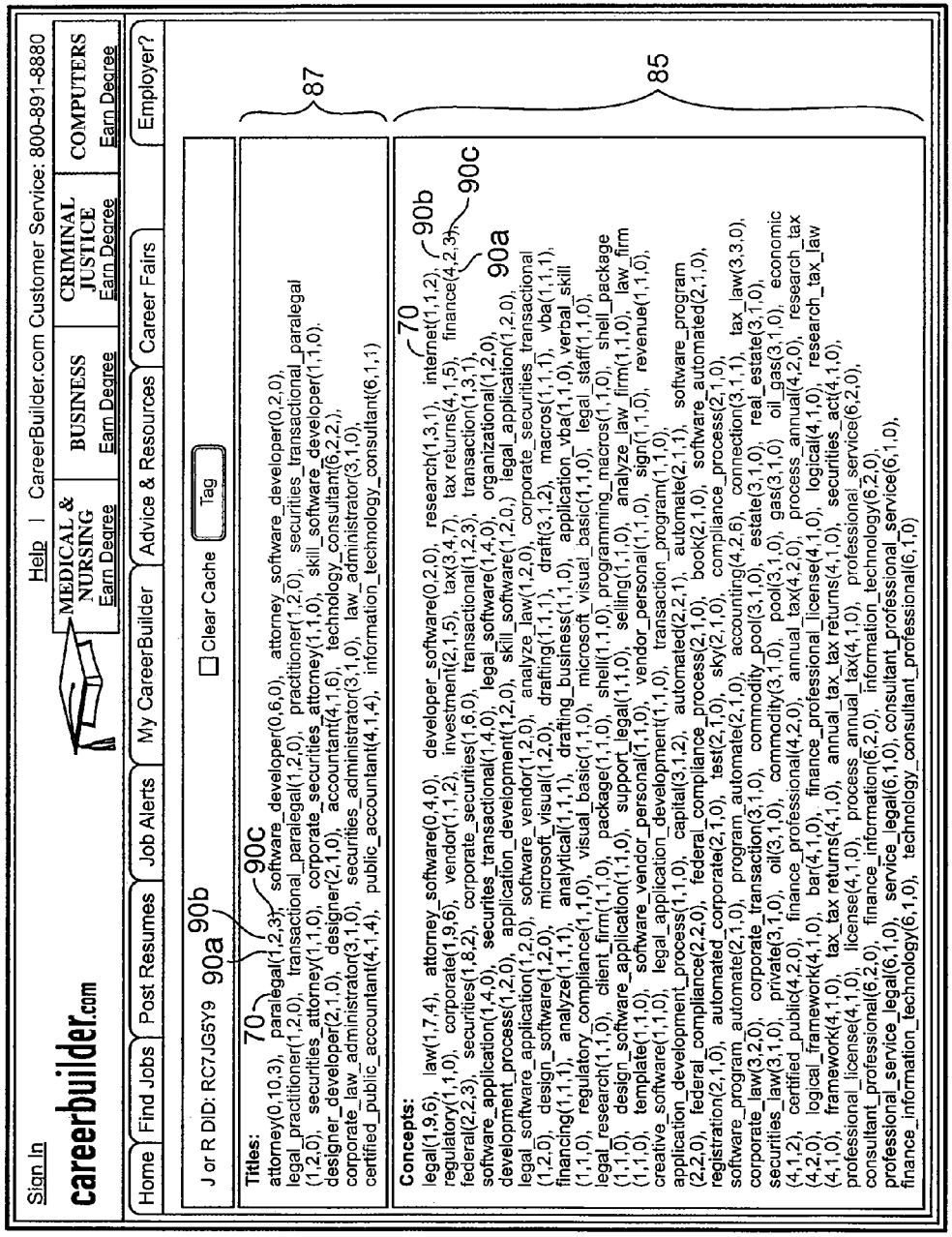
FIG. 17 illustrates an exemplary profile generated from the data set shown in FIG. 4 according to the present invention.

In one embodiment of the invention, each data set is processed by system to generate a corresponding profile 80 comprising a plurality of attributes 70a, 70b, 70c, etc. generated from each of the respective data sets. An exemplary profile 80 is shown in FIG. 17. Each data set may comprise a job posting 61 or a resume 71. In another embodiment of the invention, the system may generate attributes 70 that are separately sub-categorized into concepts 85 and titles 87. As will be appreciated by those of ordinary skill in the art, without departing from the invention, attributes 70 may optionally remain consolidated or may be categorized by any number of characteristics other than concepts 85 and titles 87, such as, for example only, education, interests, and work schedule.

Profiles

Bands

The system and process for creating a profile 80 from each data set will now be described. FIG. 4 illustrates data set comprising a user-provided resume 71. The system associates at least one of a plurality of metrics 90a, 90b, 90c, etc. (identified in FIGS. 13A and 17) with at least one attribute 70 (for example, concept 85 or title 87) generated from resume 71. In one embodiment, a metric 90a is a band 92 representing the relative position of text within the data set. Frequently, the relative location of data within a data set is indicative of the relative importance of that data. For example, in resume 71, the most recent experience 76 or the job seeker's professional objective 72 is typically near the top of the resume 71. In the context of a data set for a real estate listings, the address and price of the property is typically also at the top of the listing. Accordingly, metric 90a for band 92, which represents the location of data within the data set, is helpful in assigning relative importance to each datum within the data set as the corresponding attributes 70 are generated.

As shown in FIG. 5, Resume 71 is first broken into bands 92 and placed into band array 25a. In one embodiment, when a user uploads or enters her resume 71 into the system, the user assigns the resume 71 a title 75 and the user's most recent job title 81. The system may also request that the user select a job category 83 from a predetermined list of categories 83. The steps of parsing the data set into bands 92 is shown in FIG. 6. In step 210, system assigns the title 75, if any, to band "0" 92a. The remaining text of resume 71 is parsed by dates. At step 220, after the title 75 is assigned to band "0", the entire remaining text of resume 71 is entered into a memory field of band array 25a identified as band "1" 92b, as shown in FIG. 5A. System may use a regular expression to locate a date expression 94 in various formats, for example, Jan. 1, 2005, Jan. 1, 2005, Jan. 1, 2005, etc. Once a first date 94a is found, the system dumps all of the text that appears in resume 71 after first date 94a into a second row in the array 25a called band "2" 92c. System continues to run the regular expression through the text of data set of resume 71 until it finds the next date 94b, at which time it dumps any text data appearing after next date 94b into a new row in the array 25a referred to as band "3" 92d. Regular expression continues to search for dates 94c, 94d, 94e, etc. and dumps the text that follows each of those dates 94c, 94d, 94e, etc. into respective bands 92e, 92f, 92g until no further dates are found in the remaining text. Finally, at step 230, the system dumps the user-selected categories 83 in a final band 92g, which may optionally be segregated by an open band 92f, as depicted in FIG. 5B.

As will be appreciated by those of skill in the art, without departing from the invention, other variables may be used to parse bands 92, for example, biographical data like "education", "experience," "skills," and "professional associations". In one embodiment, the system may permit yet another band (not shown) that could be manually populated with key words by the system provider or user.

Word Array

Figure 8:
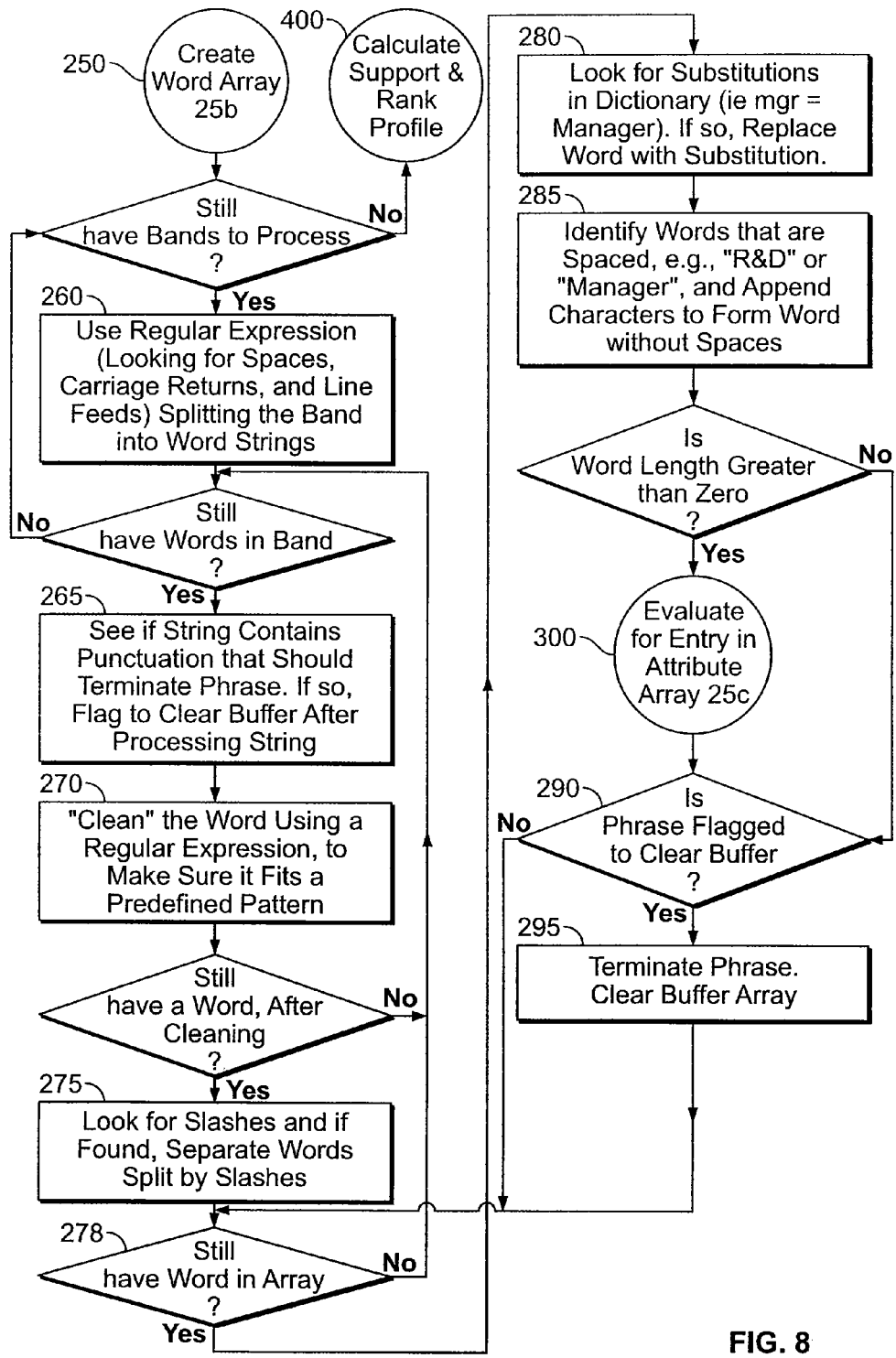
FIG. 8 illustrates the steps for parsing the band array of FIG. 4 into a word array shown in FIGS. 7A-7D.

Next, at step 250 of FIG. 6, and as shown in greater detail in FIGS. 7A-7D and 8, the system analyzes the text in each band 92*a*, 92*b*, 92*c*, 92*d*, etc. to create word array 25*b*. The steps to create the word array 25*b* are shown in FIG. 8. Starting with band "0" 92*a* shown in FIG. 5*a*, and continuing with each subsequent band 92*b*, 92*c*, etc., all of the text in each band 92 of FIGS. 5*a* and 5*b* is dumped into the word array 25*b*, shown in FIGS. 7A-7D. At step 260 in FIG. 8, each character string 96 is parsed by spaces, line feeds or carriage return characters (e.g., word or phrase) to occupy a separate row of array 25*b*, along with a second column that identifies the band 92 from which the word was found. At steps 265, 270 and 275, system then runs through each row of array 25*b* and uses another regular expression to identify and remove undesirable punctuation, such as asterisks or to separate words by slashes. As shown in FIG. 8, at steps 280 and 285, the system may optionally check each character string 96*a*, 96*b*, 96*c*, etc., against substitute database 102 to replace certain character strings 96 that have well-known abbreviations. An excerpt of substitute database 102 is shown in FIG. 9. For example, the word "a/p" or "ap" may be replaced with "accounts payable." By substituting equivalent terms, a more standardized lexicon of attributes 70 is ultimately generated in profile 80, while the original data set, such as resume 71, remains unchanged. In addition, at step 285, the system may replace irregular word spacing, e.g., "r_&_d".

Figure 10:
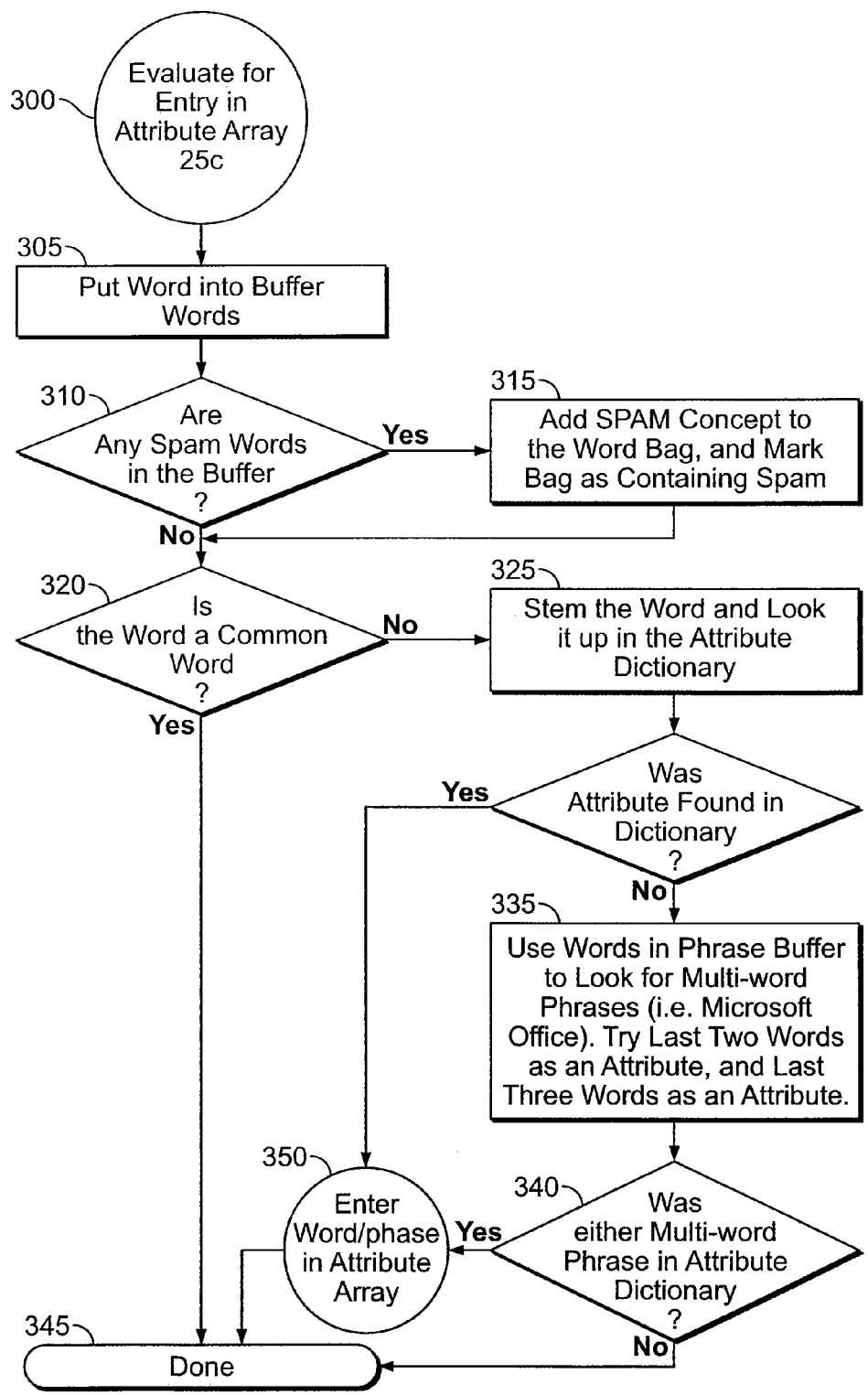
FIG. 10 illustrates the steps for evaluating words for entry into the attribute array.

FIG. 10 illustrates the steps for determining whether a character string 96 contained in the word array 25*b* should generate an entry into the attribute array 25*c*. Initially, at step 305, each word found in the word array is placed into a multi-word buffer, as described below. Then, at step 310, the system checks the words in the buffer to determine whether any pre-defined "spam" term is found within the multi-word buffer. If such a spam word is identified, at step 315, a flag is set to mark the entire profile 80 as including spam, so that the profile and associated data set can later be eliminated from matching searches or optionally called up for further investigation or review.

After stripping each character string 96 of punctuation, at step 320, the character string 96 may be searched against common word database 98. An excerpt from the common word database is illustrated in FIG. 11. If the character string 96*a* is found in the common word database 98, further processing can be aborted at step 345, and system increments to the next word in array 25*b* comprising character string 96*b*. By avoiding processing a common, and therefore, unhelpful word, the system processing speed is increased. As shown in FIG. 11, "N" designates that the word is common and therefore "not allowed." An entry labeled "Y" designates that the word may be part of a multi-word phrase, and is therefore retained.

Figure 14:
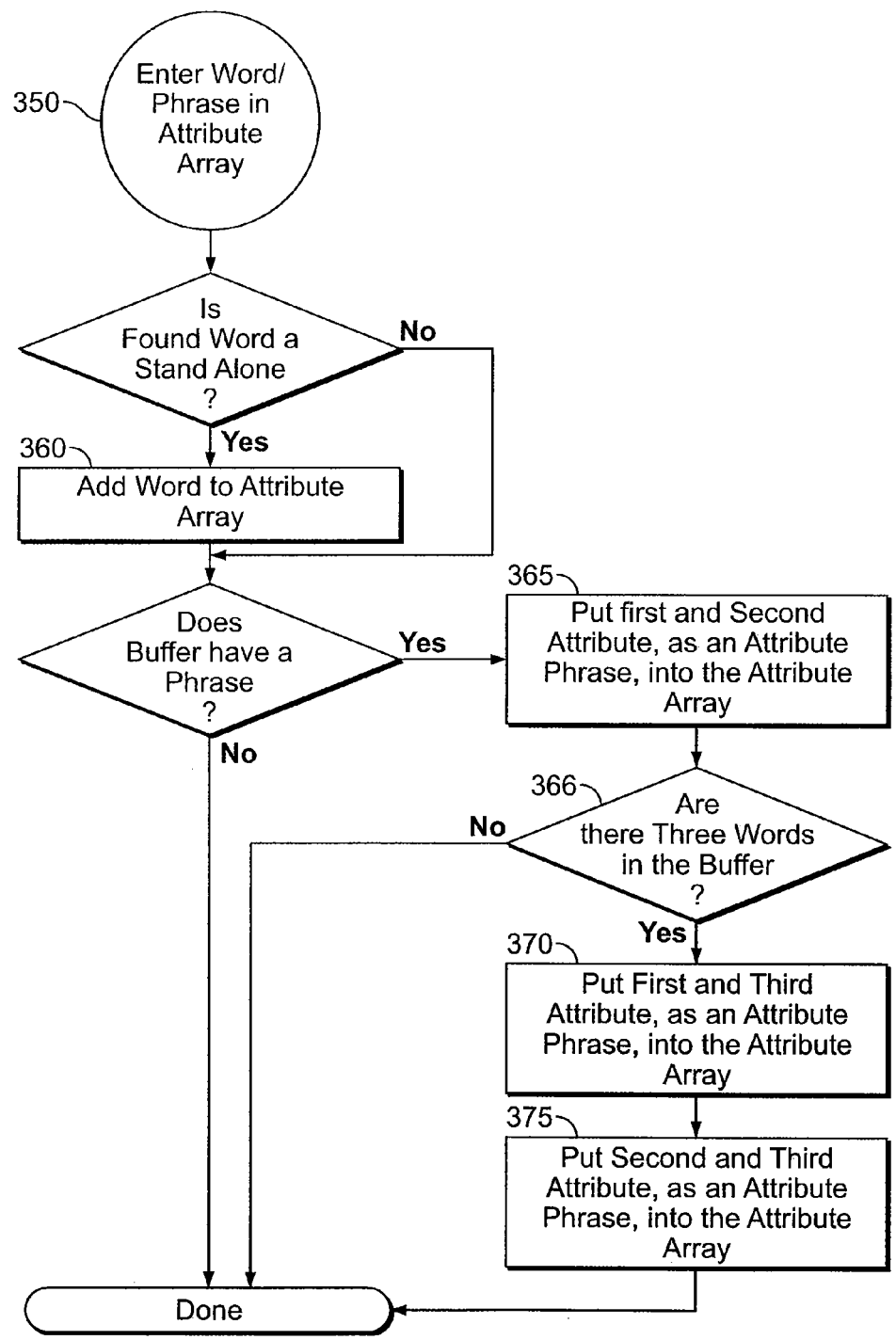
FIG. 14 illustrates the steps for entering a word or phrase into the attribute array.

At step 325, the system then compares each character string 96 in word array 25*b* against the words contained in at least one attribute dictionary 104. An excerpt of the attribute dictionary 104 is shown in FIG. 12. If character string 96 is found in attribute dictionary 104, attribute array 25*c* is created at step 350 and character string 96 is placed in attribute array 25*c*, along with an association to the band 92 in which the character string 96 was first found. A sample attribute array 25*c* is shown in FIGS. 13A-13C. FIG. 14 illustrates the steps for entering single (stand-alone) or multi-word phrases into the attribute array at step 360. In addition, counter is incremented to track metric 90*b*, which counts the number of occurrences 108 in which character string 96*a* is found in the word array 25*b*. As will be described later, a third metric 90*c*, defined as support 140, is tabulated in another column of attributable array 25*c*.

After comparing character string 96 with the attribute dictionary 104, character string 96 is also copied to buffer array to determine whether the character string 96 is part of a multi-word attribute 70. If, however, character string 96 is followed by a hard carriage return, a comma or other similar punctuation that would signal that the adjacent words are unrelated, the buffer array is cleared, as indicated in FIG. 8 at steps 290 and 295. This flag for termination is shown in FIG. 8. If character string 96 does not include such a flag, the buffer array retains the character string 96*a* to be compared with the next few words that are found in the word array 25*b*. The number of words to be saved in the buffer array can be varied within the system to optimize results.

System then searches to see whether there are any more character strings 96 in word array 25*b*, shown in FIG. 8 at step 278. If so, the steps shown in FIGS. 10 and 14 are repeated. If the character string 96 is in the common word database 98 or ends in appropriate punctuation, then at step 295 on FIG. 8, the multi-word buffer array is cleared and the system processes the next character string 96 in the word array 25*b*. If not, then at step 335 on FIG. 10, the multi-word buffer array is retained, and system searches attribute array 25*c* to see whether character string 96 has already been placed in attribute array 25*c*. If the next character string 96 is already in the array 25*c*, the occurrence counter is incremented by one. Within attribute array 25*c*, the band designation 92 retains the original value of the band 92 in which the character string 96 was first found, even if later occurrences are identified in later bands. The system then checks, at step 335 on FIG. 10, to see whether the multi-word buffer array contains any multi-word attributes 70 contained in the attribute dictionary 104. If so, the system checks to see whether the multi-word is found in the attribute dictionary 104. If it is in the attribute dictionary 104, then at steps 365-375 on FIG. 14, the attribute array 25*c* is populated with a new multi-word attribute 104, then at steps 365-375 on FIG. 14, along with the band 92 from which the multi-word attribute word was triggered.

An example will illustrate the population of the attribute array 25*c*. Refer to the following text that is entered into band array 25*a* shown in FIG. 5A: "attorney/software developer who has designed, written and been selling and supporting legal practice software applications." As shown in FIG. 7A, the character string 96 "attorney" is encountered in the word array 25*b* at line 2. The word "attorney" is located in the attribute dictionary 104 (although the word "attorney" is not specifically shown), so it is placed in attribute array 25*c*, shown in FIG. 13A, along with the band 0. In addition, the occurrence counter is incremented to "1." The word "attorney" is then saved in the buffer array. The system then finds the next character string 96, in this example, "software." As described below, because "software" is such a commonly-used word, it is considered a dependent attribute, and is not placed in the attribute array 25*c*. Similarly, the next word, "developer," another commonly-used word, is also designated a dependent attribute, and is therefore not placed in the attribute array 25*c*. But, the multi-word buffer array 110 now contains the words "software" and "developer," which, as a combined multi-word phrase, is found in the attribute dictionary 104 (multi-word phrase is not shown). Accordingly, system checks the attribute array 25*c* to see whether the multi-word attribute 70 "software developer" has already been entered. Since this is the first occurrence of "software developer," the multi-word attribute 70 is entered in the array 25c, along with its associated band 92, band "0" 92a, and the counter is initially incremented to "1." As seen in FIG. 13A, the multi-word "software developer" attribute is found in the word array 25b for a total of six occurrences.

As also depicted in FIG. 13A, the system also identified the multi-word attributes 70 "attorney software" and "attorney software developer." As seen with this example, the generation of a single occurrence of the words "attorney", "software" and "developer" in sequential order within the word array 25b yielded four separate attributes 70 in the array 25c, namely, "attorney", "software developer," "attorney software," and "attorney software developer." Later, as shown on FIG. 13B at line 7, when the system encounters "software" followed by "application," it created a new entry in attribute array 25c for "software application," which was incremented for a total of four occurrences. Referring to element 6 in FIG. 7A, the word in word array 25b is "am," which is found in the common word database 98, so the "am" character string 96 is ignored, the buffer array is cleared and the system selects the next character string in band array 25b, which is element 7, "an."

In one embodiment, a further enhancement is provided by subcategorizing the attributes 70 as either concepts or titles. For example, the word "accountant" is identified as a title, whereas the word "accounting" is considered a concept. This can be accomplished by distinguishing between concepts and titles within the attribute dictionary 104 or by creating separate dictionaries, one title dictionary and another concept dictionary. For example, the excerpt from the attribute dictionary 104 shown in FIG. 12 differentiates titles and concepts as follows: a "c" represents an independent (or stand-alone) concept; "cd" represents a dependent concept; "s" represents a stand-alone title; and "d" represents a dependent title. Alternatively, separate dictionaries may be used, and the system can look up each character string 96 first in the title dictionary and if no match is found, then character string 96 may be looked up in the concept dictionary.

The idea of identifying independent attributes, which are entered in the attribute array 25c by themselves, and dependent attributes, which must be combined with other terms, can be applied to concepts and titles as shown in FIG. 12. The dependent concepts and titles are words that are commonly used, but provide little or no value in matching a candidate with a relevant job opening, unless combined with another word. As described in the example above, neither the concept "software" nor the title "developer" is helpful by itself in identifying qualifications of a job applicant or needs of an employer. But when the two words are combined, the phrase "software developer" is a recognized job title that is a helpful attribute.

Alternatively, dependent concepts and dependent titles can be separated into separate databases, for example, in dependent concept database and dependent title database. If the character string 96 is found on either database, character string 96 is not placed in the array 25c, but it is placed in the multi-word buffer and may be placed in the array 25c along with the next character string 96b if the next word meets the criteria in steps described in FIGS. 10 and 14. The system can be set to buffer a variable number of words, although buffering up to four words has been found advantageous. This permits multi-word attributes 70 comprised of four or less words to be identified, for example, "securities transactional paralegal," "information technology consultant," and "corporate securities transactional."

The steps in FIGS. 8, 10, and 14 are repeated until there are no more character strings in the word array 25b. At this point, attribute array 25c will be filled with the all of the attributes 70 (or substitutions) generated by the word array 25b that appear in attribute dictionary(ies) along with the identity of the respective band 92 in which each attribute 70 was first encountered and the total number of occurrences that each attribute 70a, 70b, 70c, etc. appeared in word array 25b.

Next, the system checks each attribute 70 (concept or title) in the array 25c against the attribute dictionary (104, shown in FIG. 12) to identify synonyms as shown in column 105 to reduce redundancy and enhance the results during the searching and matching routine. For example, the words "a+", "a+ certification" and "a+ certified" would all be replaced by the attribute "ID" 70 for the attribute "a+ certified" as provided in the synonym column 105, shown in FIG. 12. As with the substitute list 102 described earlier, this routine adds consistency to the results.

Tagger

In an alternative embodiment, rather than placing the words in the word array 25b, pond 35 of words is created from the band array 25a. The pond 35 is created by converting the data structure and data contents of the band array 25a into a doubly-linked list. As will be known by those of ordinary skill in the art, a doubly-linked list comprises a sequence of nodes, each containing a data field and having two references, one pointing to the previous node and the other to the next node in the list.

Through a series of operations, the doubly-linked list, which comprises pond 35, is tagged using HTML to assign tokens to certain items in the double-linked list. The tokens may identify attributes 70, such as a dependant concept or title 36, an independent concept or title 37, a negator such as the word "not" (not shown), a break 38, an unrecognized word 39, a slash group 45, or a connector 43, as will be described further. In one embodiment, pond 35 tokens may be color coded in HTML. For example, in FIGS. 20A-20E, pond 35 identifies several pond items, including "software" and "program," which may be displayed in orange to designate dependant concepts or titles 36; "engineer" and "c++," which may be displayed in green to designate concepts or titles 37; "←band→," ":" ";" which may be displayed in red to designate hard breaks 38 between words in the pond; "in the," "in," "of," and "←line→," which may be displayed in blue to designate connector 43 that may join adjacent items; and finally, items grouped within "{ }" brackets to indicate slash groups 45.

The addition of the tokens may be done in sequential operations. For example, multiword concepts—such as "visual basic," in which neither "visual" nor "basic" is, by itself, a concept or title but becomes a concept when appearing adjacent one another—may be identified and tagged. Similarly, multi-part concepts—such as "computer science," which include dependant and independent concepts or titles—may be identified and tagged. The use of a double-linked list for the pond eliminates the need to maintain a multi-word buffer, and also permits greater flexibility for combining attributes 70 that are spaced more than a limited number of positions away from one another. For example, in the embodiment employing a buffer, described above, the combination of multi-word attributes is limited by the number of words or character strings 96 held in the buffer, whereas by using a double-linked list, the words may searched for attributes 70 anywhere within the double-linked list (i.e., pond 35), subject to any tagged limitations, such as hard breaks 38 or negators. This advantage increases the flexibility for combining separate attributes surrounding attributes within a slash group. The tokens further provide flexibility for defining and modifying behaviors (i.e., programming instructions) associated with particular types of words. For example, by retaining a connection between two lists of words, a connector 43, such as "of," may identify a useful attribute 70, such as "human resources manager" from the original "manager of human resources."

A post processing step may be optionally provided in which "orphaned" attributes are identified and replaced with more meaningful attributes. For example, if the dependant title "engineer" appears by itself in one location in the pond but the multi-word title "electrical engineer" appears elsewhere in the pond, the orphaned dependant title "engineer" may be replaced with "electrical engineer."

In further aspect of this embodiment, because the attributes, such as independent concepts or titles (or both) 37, have already been identified in the pond 35 during the tagging process, the attribute array 25c may be readily created by running through the tagged pond. The attribute array is illustrated in FIGS. 13A, 13B, 13C, and 20A.

Assigning Support Metric

Figure 16:
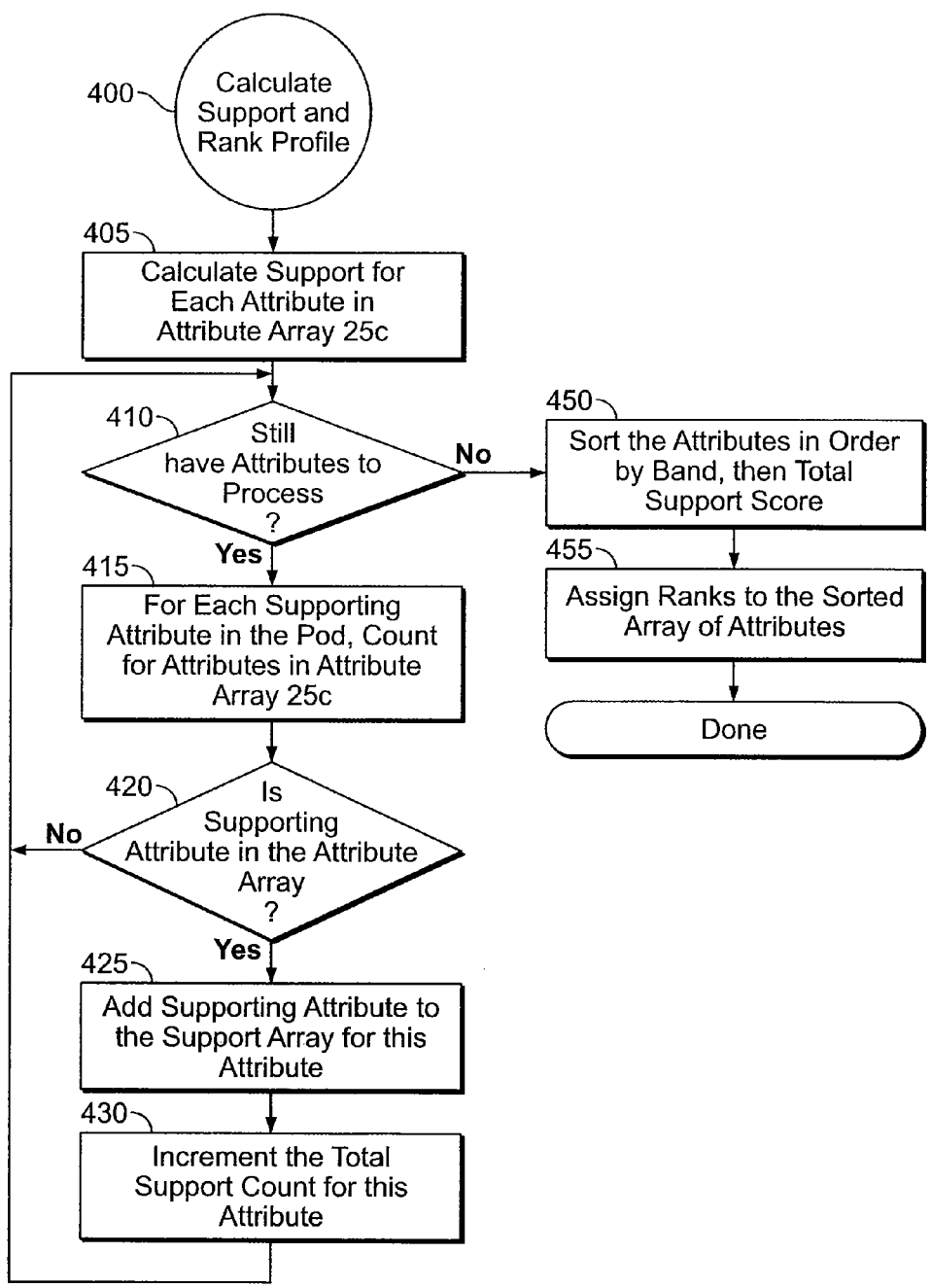
FIG. 16 illustrates the steps for calculating support values and ranking the attributes within the profile.

To further enhance the accuracy of the profile generation, each attribute 70 that is entered into array 25c is evaluated by how closely the attribute 70a, 70b, 70c, etc. is related to other attributes 70a, 70b, 70c, etc. in the array 25c. This is accomplished by the use of attribute "pods" 125. FIG. 15 shows excerpts from a sample pod 125a. FIG. 16 illustrates the steps described next for generating a support metric 90c.

Each pod 125a, 125b, 125c, etc. identifies the relatedness of a "root" attribute 130 (for example, concept or title) to other words that may appear within word array 25b (which, in turn, are related to words appearing in the data set, for example, a resume 71 or a job posting 61). Each pod 125a, 125b, 125c, is created by conducting an analysis for each root 130 to determine what other attributes 70a, 70b, 70c, etc. are related to the root 130. In one embodiment, every attribute 70a, 70b, 70c, etc. is designated, in turn, as the root 130 and searches are conducted through a large number of sample data sets (for example, resumes 71a, 71b, 71c, etc. and/or job postings 61a, 61b, 61c, etc.) or sample sets of profiles 80 to identify each occurrence of another attribute 70, which is referred to as a "leaf" 135.

The pod 125 information can be refined, for example, by counting the number of occurrences in which both the root 130 and each leaf 135 appears (a) within a given data set, (b) within the same paragraph of a data set, and/or (c) within the same sentence of a data set. Similarly, the comparisons could be made between attributes 70 appearing in profiles 80 and within the same bands 92. The resulting occurrences 108 for the sample data sets are then compiled into a pod 125 for each root 130, identifying how many times each leaf 135 is associated with the root 130. Thus each pod 125 can list the number and percentage of occurrences that both the root 130 and each leaf 135 appeared within the same document, paragraph, and sentence of the sample data sets or same bands 92 of profiles 80a, 80b, 80c, etc. An example of the pod 125a for the root, "accountant" is set forth in FIG. 15.

Pods 125a, 125b, 125c, etc. may be used to scale the profile 80 in several ways and to add various degrees of precision by assigning a metric 90c for "support" 140, which signifies the presence of attributes 70 that are more likely related to the root 130. For example, in one embodiment, the pod 125 may be truncated into a binary value, whereby "1" identifies the existence of a relationship and "0" identifies the absence of a relationship. This assignment of support value is shown in steps 405-430 on FIG. 16. To illustrate, in a given array 25c, if a leaf 135 appears in the pod 125 for a root 130, support 140 counter would be incremented by one, at step 430, regardless of whether the leaf 135 appeared in all of the sample data sets or only one of the sample data sets. In this scenario, each time any leaf 135 is found in the pod 125 for a root 135a, the counter would be incremented by 1 for that particular root 130a. Thus, if many leafs 135a, 135b, 135c, etc. for a particular root 130a are found in the attribute array 25c, the support 140 for the root 130a is high and the root 130a is weighed more strongly in the profile 80.

In an alternate embodiment, the relative percentage of appearances of each leaf 135a, 135b, 135c, etc. to each root 130a can be cumulatively added and then normalized with the other metrics 90 (e.g., the band 90a and occurrence 90b scores). For example, as seen in FIG. 15 pod 125a for the root 130a "accountant" and the leaf 135a "certified" provides support 140a of 54.16%, and support 140b for the leaf 135b, "gaap" of 76.00%. So, if a profile 80 includes the root "accountant" and the leafs "certified" and "gaap", these support values can be added to 130.16%. Accordingly, the support 140 values for all the leafs 135a, 135b, 135c, etc. in the attribute array 25c associated with each root 130 could be totaled for a grand support 140 value for each concept in the attribute array 25c.

In another embodiment this total support 140 value can then normalized to correspond with the approximate magnitude of the other metrics 90a, 90b, 90c, etc. associated with the attribute array 25c. Normalizing the support 140 value can be done many ways without departing from the invention. For example, in one embodiment, the support value 140 totals are divided by a value such as the highest score of all the support 140a, 140b, 140c, etc. value totals and then multiplied by a multiplier.

In another embodiment, each gross support 140a, 140b, 140c, etc. value can merely be ranked. For example, the gross support 140 value can be replaced by the reverse rank (so the highest gross support 140 value would have the highest value). To illustrate, as shown in Table 1, if a series of root attributes 130 have a gross support 140 values of root 140a=1209, root 140b=2409, root 140c=478, root 140d=8904, root 140e=35, root 140f=0, the support 140 values assigned in attribute array 25c could be as follows: root 140a=3, root 140b=4, root 140c=2, root 140d=5, root 140e=1 and 140f=0. Various methods for using the pods 125 for assigning relative weighting for the support 140 value may be employed without departing from the invention.

TABLE 1

| ROOT | GROSS SUPPORT | SUPPORT VALUE |
|------|---------------|---------------|
| 140d | 8904 | 5 |
| 140b | 2409 | 4 |
| 140a | 1209 | 3 |
| 140c | 478 | 2 |
| 140e | 35 | 1 |
| 140f | 0 | 0 |

Ranking the Profile

To complete the profile 80 for each data set, the metrics 90 are used to rank the attributes according to relative importance, as identified in steps 450 and 455 of FIG. 16. FIG. 17 shows an exemplary profile 80. In one embodiment, all the generated attributes 70a, 70b, 70c, etc. are placed in the array 25c in order of appearance within the bands 92 as shown in steps 450 and 455, shown in FIG. 16. That is, all the attributes 70a, 70b, 70c, etc. found for the first time in band "0" 92a are listed as band "0", then band "1", band "2", and so on. Next, after the support values 140a, 140b, 140c, etc. are assigned, the leafs 135a, 135b, 135c, etc. that are found supporting each root 130a, 130b, 130c, etc. are pulled up in order of descending support value 140 behind each related root 130. Finally, within each group of root 130 and associated leafs 135a, 135b, 135c, etc., the leafs are listed in order of number of occurrence 108. This ranking or weighting scheme is exemplary and other schemes may be used without departing from the invention.

Once the array 25c and associated metrics 90a, 90b, 90c, etc., such as, band 92, occurrence 108 and support 140, are ranked, the attributes 70 and associated metrics 90a, 90b, 90c, etc. can be saved as a profile 80, which is associated with the respective data set from which the profile 80 was generated. For example, FIG. 17 illustrates the ranked attributes 70 for the sample resume 71 shown in FIG. 4. In this example, titles 87 are broken out from concepts 85 into separate lists. The values in parenthesis after each attribute 70 represent the band 92, occurrences 108, and support 140 generated for each attribute 70. The attributes 70 are thereby ranked in order of relative importance in the context of the originating data set. The respective list of titles 87 and concepts 85 can be selectively combined, for example, by interleaving the two ranked lists, (i.e., by placing the highest ranked title 87 first, then the highest ranked concept 85, then the second highest ranked title, etc.) or by giving each variable weight.

In addition, the data set may also be further associated with user account information. For example, a job seeker may have an account set up that can include contact information, history of job postings that the job seeker has reviewed, job postings that the job seeker has applied for, and other data associated with the individual. Similarly, a job poster or employer may have a user account that retains contact information, service packages, billing information, other job postings, applications received for each job posting, and other information associated with the employer.

In one embodiment, a user may be given an opportunity to see the resulting profile 80, for example in the format shown in FIG. 17, and be permitted to modify the profile 80. For example, the user could be permitted to emphasize or deemphasize certain attributes 70, their associated metrics 90 or manually adjust their ranking A job seeker may notice that a particularly important attribute 70 is ranked lower than other less important (to the user) attributes 70. Accordingly, the user may optionally be permitted to adjust one or more of the metrics 90 for the attribute(s) 70 to give the attribute(s) 70 more significance when used for matching, as described below.

It will be appreciated by those of ordinary skill in the art that the system and method, which is described above in the context of data sets comprising resumes 71, could just as readily be used for other data sets, including job postings 61. For other data sets, the metrics 90 used to score the attributes 70 may be varied. For example, job postings 61 typically do not delineate information by date, as is typical with resumes 71, but may instead parse the data by title, experience, and skills. Accordingly, bands 92 could use different character strings or words rather than dates to parse the data set.

Moreover, the system and method for creating standardized profiles 80 for non-standard data sets can be used for data sets unrelated to recruiting and employment, including for example, dating or match-making services, real estate listings, classified advertising, used-car listings, etc.

Assigning a Level Metric

In another embodiment, the profile 80 may include a level, which is commensurate with the degree of skill represented by the data set, that is, a level being sought by a job posting or attained by a job seeker. For example, education level 47 represents a metric 90 and job level 49 represents another metric 90.

The education level 47 is derived from a search of keywords contained in the data set that represent education, such as "high school", "BA", "BS", "MBA", "masters degree", "MD", "PhD", etc. If such keyword are contained in the data set, a metric 90 representing 47 is assigned, which is indicative of the education level. Education levels may include:

| | |
|---|---|
| EL_HS | High School |
| EL_BA | Bachelor of Arts |
| EL_BS | Bachelor of Science |
| EL_RN | Registered Nurse |
| EL_MS | Master of Science |
| EL_MBA | Master of Business Administration |
| EL_MD | Medical Doctor |
| EL_PHD | Doctor Philosophy |

The job level 49 may be derived using the education level 47 as an input, as well as by factoring in additional data from which a job level 49 may be assigned. For example, in one embodiment, the job levels 49 may be assigned as "entry", "mid", "senior", or "executive." In addition to the education level 47 described above, another input may include the results of a search identifying other keywords that are indicative of job level 49, for example, "vice president", "vp", "manager", "supervisor", and others.

Beyond keyword searching, the method and system may also seek other indicia of job responsibility, like managing other people. In one embodiment, upon a job seeker posting his or her resume, the system may ask whether the job seeker has ever managed people, and the resulting answer may be used as an input for evaluating job level 49. Similarly, an input for the appropriate job level 49 may include the numbers of years of experience in a particular field. The number of years of experience can be identified by using regular expressions to identify all the date designations for a particular position on a resume, and calculating the number of years from the date of one position to the date of the prior position.

Based on one or more of the inputs described above, scores may be tallied to assign a job level 49. In one embodiment, job levels 49 are assigned as either "entry", "mid", "senior", or "executive". In one embodiment, the data set begins with a default job level of "mid" and the inputs described above are used to tally points for the respective levels. For example, the presence of "high school" may generate adding a point to the job level, "entry", whereas the presence of "MBA" may generate adding a point to the job level, "senior". Similarly, having less than two years of experience may generate a point for the job level, "entry", while more than five years experience may generate a point for the job level 49, "senior". Upon tallying all the points based on the various inputs described above, the tallies are compared to assign a job level 49. In one exemplary tally, if the tally for "executive" had more points than "entry" and "senior," the data set would be assigned an "executive" job level 49. If the tallies for "entry" is less than "senior", and "senior" is tied with "executive," a job level 49 of "senior" would be assigned. If the tally for "senior" is two or more than the tally for "entry", the data set may be assigned "senior", whereas any differential less than two will result in an assignment of "mid." In another example, if the tally for "entry" is two or more than the tally for "senior," the data set may be assigned "entry," whereas any differential less than two will result in an assignment of "mid." In the last two examples, requiring at least a two-point differential between "senior" and "entry" results in a "mid" assignment for any close results, and prevents skewing the assigned job level 49 unless there is a meaningful indication that a job level 49 is higher. In the described embodiment, the default job level 49 when there are no indicia of seniority is "mid."

As will be understood by a person of ordinary skill in the art, the various levels create a spectrum of experience and skill, and various logic can be used to generate job level 49 assignments that will be beneficial in matching data sets.

Once assigned, the job level 49 may be used in various ways to filter, search and display the output of matched profiles, as will be described next.

Matching Profiles

Once profiles 80 are generated for a series of data sets, the profiles 80 may be leveraged in many ways. Because the data sets—be they resumes 71, job postings 61, or others—are generated into profiles 80 having standardized sets of attributes 70 and organized in a standard ranking or scaling scheme, disparate data sets can be efficiently compared, grouped, and ranked. One use for the profiles 80 is to match prospective job seekers having respective resumes 71 to a particular job posting 61. Conversely, the profiles 80 can be used to match prospective job postings 61 to a particular job seeker having a resume 71. In addition, a job seeker who is interested in a particular job posting 61 can leverage that particular job posting profile 80 to search for other job postings that are similar to the job posting of interest. Similarly, employers can leverage the profile 80 of a particular job seeker's resume to search for other job seekers whose resumes are similar to the resume of interest.

Once the profiles 80 of the data sets are generated, there are many ways known in the art to conduct searches and generate matches between one profile 80a of a data set to find the closest matching other profiles 80b, 80c . . . 80n. In one embodiment, the system converts each profile 80 into a series of numerical values, where each available attribute 70 is assigned a unique numeric integer value or identifier (e.g., "ID"). Such numeric IDs are illustrated in FIG. 12. Converting the text value of each attribute 70a, 70b, 70c, etc. into a numeric value increases the efficiency of commercially available search engines. Accordingly, each of the attributes 70a-70n in a profile 80 can be converted into its assigned numeric value, for example, the attribute 70 ".net" shown in FIG. 12 may be assigned numeric value "80 4685." Because integer values can comprise significantly smaller amounts of data than full ASCII character words, this translation can speed up the processing time for the search engine. This conversion from text character to integer value can be performed while the profile 80 is being created or after it is done.

One example of a suitable search engine 60 for use in generating searches to match various profiles 80 is offered by Fast Search & Transfer ASA. One search engine solution offered by Fast and suitable for use with an embodiment of this invention is FAST Data Search™.

To conduct a candidate search of a plurality of resumes 71a, 71b, 71c, . . . 71n based on a profile 80a for a job posting, (for ease of reference, the "subject profile 80"), the subject profile 80a can be readily converted into a search query for input into the search engine 160 to conduct a search of a plurality of resume profiles 80 (the "target profiles 80b-80n").

The search can optionally be weighted to further enhance the search results. In one embodiment, the query based upon the subject profile 80a can be created by weighting each attribute 70a-70n according to its ranking within profile 80a, so that the highest ranking attribute 70a is weighted highest in the search, the second highest-ranking attribute 70b is weighted second highest, and so on through all the attributes 70n.

Similarly, it is beneficial to weight the target profiles 80b-80n to enhance the search results. While the search query can include as many attributes 70 as desired, it is more practical and efficient to limit the number of attributes 70 that are separately weighted among the target profiles 80b-80n; otherwise, the amount of data for all the attributes 70 associated with all the target profiles 80b-80n would slow the search engine. Accordingly, the attributes 70 of the target profiles 80b-80n may be weighted in tiers. If each target profile 80 (e.g., resume profile) contains a ranked list of, for example, forty-three separate attributes 70, the forty-three attributes 70 can be weighted according to the following tiers. The first 10 attributes can each be assigned a weight of, for example, 5000 points, while attributes 11-20 may each be assigned a weight of, for example, 700 points, and attributes 21-43 may be assigned a weight of, for example, 10 points.

The query generated from the subject profile 80a will then cause the search engine 160 to return a list of target profiles 80b-80n (in the foregoing example, resume profiles) in a ranked order by how closely the weighted target profiles 80b-80n match the subject profile query. These are matching profiles 165, as identified in FIG. 18.

Figure 18:
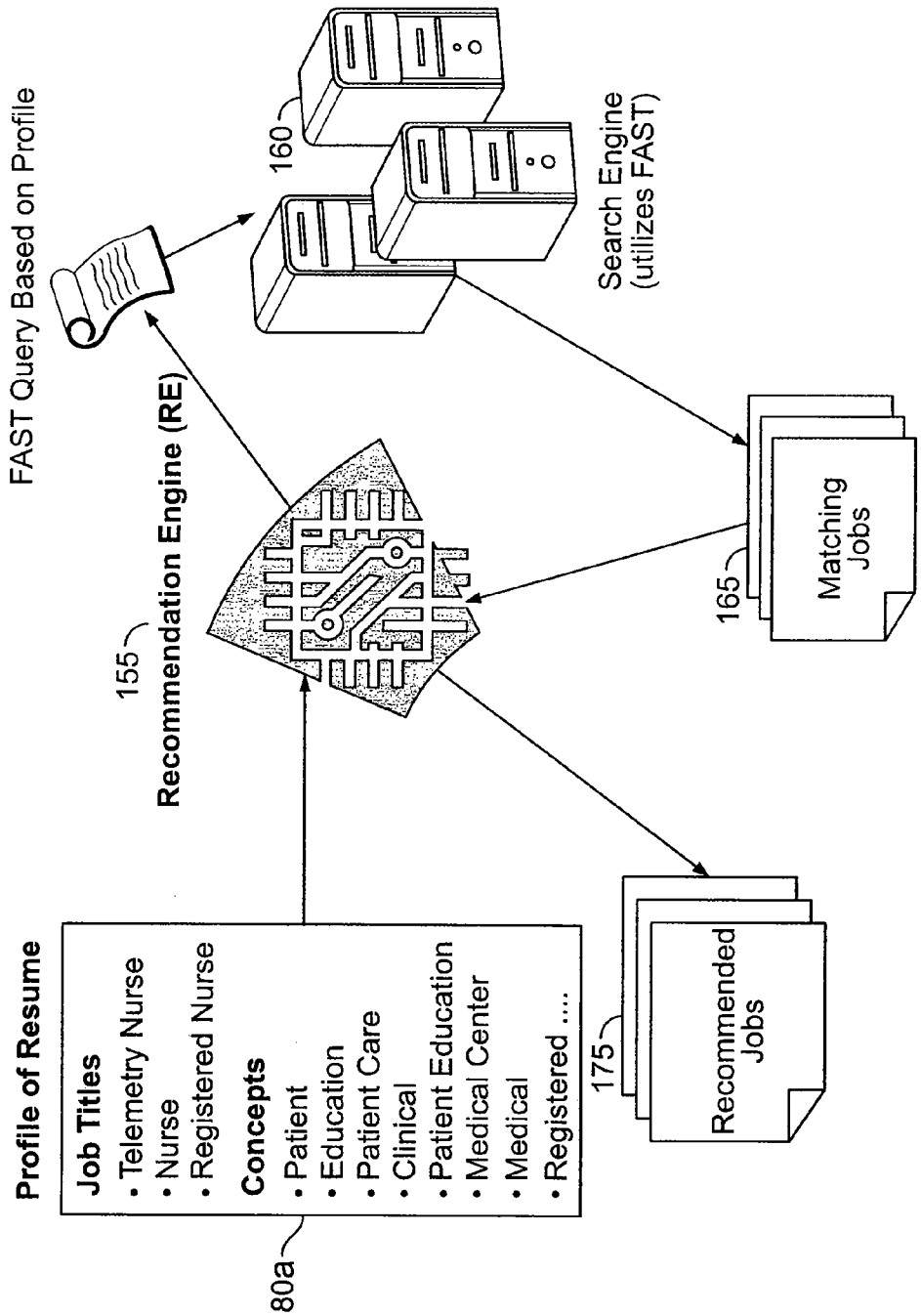
FIG. 18 illustrates a recommendation engine, as used in the present invention.

The system can optionally provide even further refinement of the search results by using a recommendation engine 155, as illustrated in FIG. 18, to select recommended profiles 175 from the matching profiles 165. The recommendation engine 155 may eliminate target profiles 80b-80n that fail to meet a minimum threshold matching score or modify the ranking of the profiles 80b-80n. In other words, the subject profile 80a may be compared against each target profile 80b-80n retrieved by the search engine and through the following process matching scores may be assigned to each target profile 80b-80n. Specifically, the system checks each attribute 70 in the subject profile 80a against each target profile 80b-80n retrieved by the search engine and, using a suitable formula that will be described below, assigns points corresponding to how closely the attributes 70 in the subject profile 80a correlate with the attributes 70 in the target profile 80b-80n. An attribute 70 that is listed in both the subject profile 80a and a target profile 80b-80n can be referred to as a "matching attribute" 150. The degree with which a subject profile 80a matches a target profile 80b-80n will depend on the number of matching attributes 150 and the relative ranking of each matching attribute 150 within the subject profile 80a and a target profile 80x. For example, a target profile 80x, shown in FIG. 19, whose lowest-ranked attribute matches the highest-ranked attribute of the subject profile 80a will likely be less relevant than a target profile 80y, whose highest-ranked attribute matches the highest-ranked attribute of the subject profile 80a.

Accordingly, in one embodiment, points are assigned to each target profile 80b-80n based on how high the matching attributes 150 for both the subject profile 80a and the target profile 80x rank. For example, the system checks each attribute 70x in the subject profile 80a to HI determine whether the same attribute 85 is also included in the target profile 80x. For attributes that do not match, no points are assigned, and the system moves to the next attribute 70 in the subject profile 80a. If the system finds a matching attribute 150, it assigns points based on how high the matching attribute 150 is ranked in the subject profile 80a. The system runs through all the attributes in the subject profile 80a and compiles the total points based on the ranking of the matching attributes 70 within the subject profile 80a. Obviously, if only the five bottom ranked attributes 70 in the subject profile 80 matched the attributes in the target profile 80x, there may not be a very good match, even if such five matching attributes 150 were ranked high in the target profile 80x. As a result, the system then repeats the process, but this time assigns points based on how high the matching attributes 150 are ranked in the target profile 80x. Then the points assigned for the subject profile 80a and the points for the target profile 80x are added together for a total matching score.

To convert the highest rank (which is typically represented by the lowest number, i.e., first or 1) to the highest points, the system assigns the total number of attributes in the subject profile 80a, minus the rank of each matching attribute 150. For example, assuming there are 50 attributes in the subject profile 80, if a matching attribute 150 is the highest ranking attribute in the target profile 80x, the target profile 80x would be assigned points equal to 50−1=49.

In one embodiment, to enhance the screening and create even more differentiation between the rankings, the results are then squared. So in the last example, $(50-1)^2=49^2=2401$ would be assigned to the target profile 80x. The system may then search for the next matching attribute 150 and continue assigning points until all the matching attributes 150 were assigned points. The total points will identify how high the matching attributes 150 were ranked in the target profile 80x. Then the system repeats the tally by assigning points for how high the matching attributes 150 ranked in the subject profile 80a.

Figure 19:
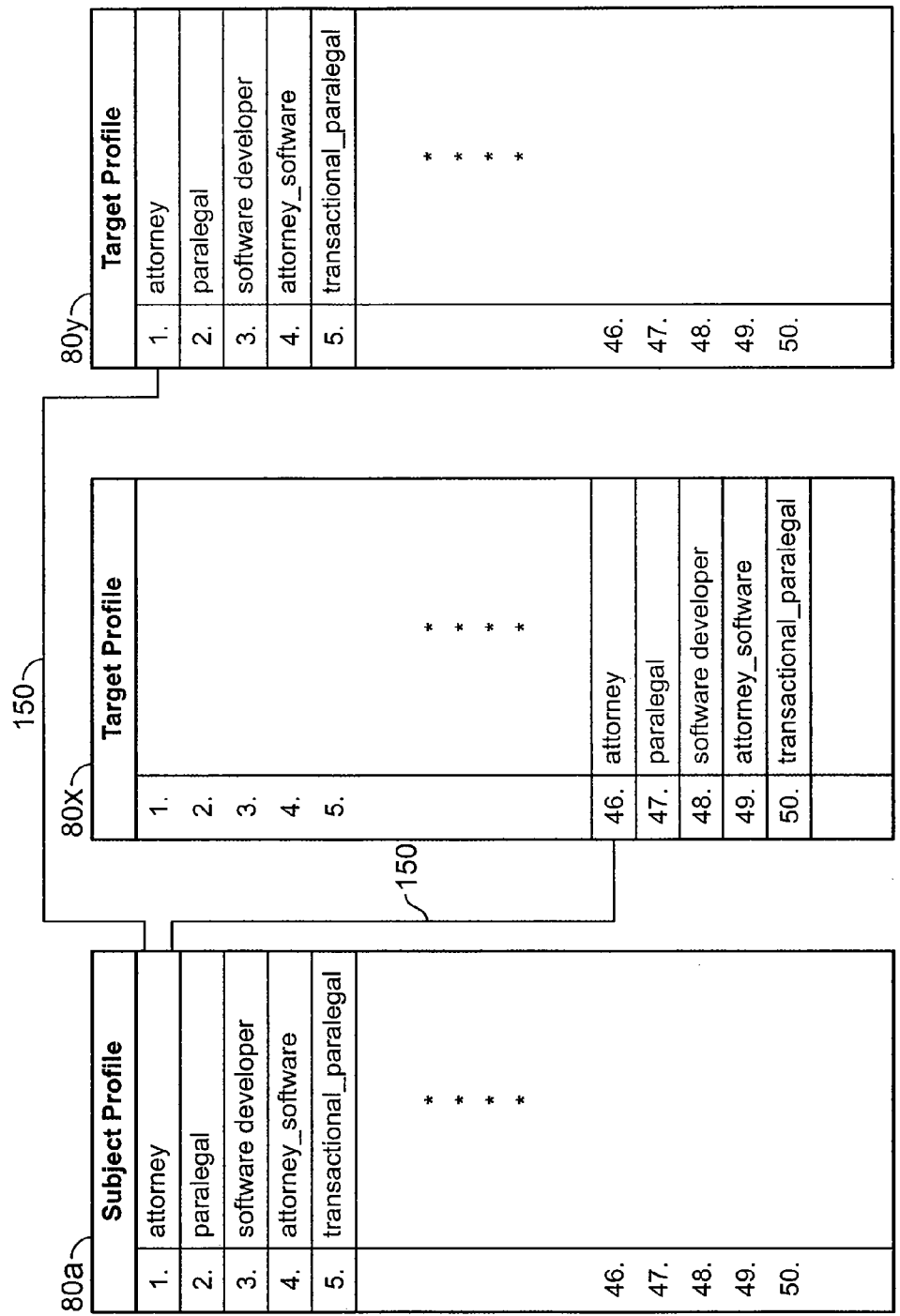
FIG. 19 illustrates the profile matching conducted by the recommendation engine shown in FIG. 18.
Figure 22A:

This can be illustrated by an example, as shown in FIG. 19. Assume that there are five matching attributes 150 between a subject profile 80a and a target profile 80x, and for simplicity, assume that both the target profile and subject profile each have 50 attributes. Further assume that the matching attributes 150 were the top five ranked attributes in the subject profile 80a. In this case, the score would be $(50-1)^2+(50-2)^2+(50-3)^2+(50-4)^2+(50-5)^2=11055$. If the five matching attributes 150 were ranked 46-50 (at the bottom) in target profile 80x, the totals would be $(50-50)^2+(50-49)^2+(50-48)^2+(50-47)^2+(50-46)^2=0+1+4+9+16=30$. To further enhance the matching results, the two scores can be added together for a total score of 11085. In contrast, compare to another example using a target profile 80y having the same matching attributes 150 as target profile 80x, but where they are ranked in the top five on the subject profile 80a. This would yield a score of 11055, so when the two scores were added together, the total score would be 22110.

This calculation can be completed for each target profile 80b-80n retrieved by the search engine. Finally, the point totals are normalized by dividing the score for each target profile 80b-80n by a perfect score for the subject profile 80a, where a perfect score would be the matching score that would be yielded by a profile that exactly matched the subject profile 80a. Using this scoring method, it has been found that matching scores of less than 18% yield unsatisfactory results. Thus, target profiles 80 yielding a match score less than a preset threshold may be optionally discarded. It should be understood that this threshold can be changed or varied to optimal values without departing from the invention.

While this describes one method for identifying how closely a target profile matches a subject profile, many other methods can be employed without departing from the invention. For example, the ranking of each matching attribute within the subject profile and the target profile can be compared to determine the relative degree of similarity between the two profiles. For example, if a matching attribute is ranked third in the subject profile and ranked $34^{th}$ in the target profile, the matching attribute could be assigned a score of the difference, i.e., 34−3=31, and this score can be used to screen or weight the importance of the matching attribute. So, for example, the system could optionally discard any matching attributes that are not within a predetermined number of ranking from each other.

The same technique can be used to input a resume profile 80 into the search engine and generate job posting profiles. Indeed, the system can be used to create matches between the profiles created for any data sets. For example, the system could be used to compare individual profiles for a personal match-making service, real estate listings, classified advertising, used car listings, etc.

As will be appreciated by those of skill in the art, the present system may be used to generate matches between various data sets. For example, upon uploading a new resume, a user could be provided with a list of suitable job postings. Similarly, upon an employer uploading a job posting could be provided a list of suitable resumes based on the output of the system and method described herein. In addition, a job seeker who has found one job posting of interest could request that the system find other job postings that are similar to the job posting of interest. Conversely, an employer who finds a candidate of interest could request the system generate a search using the system and method disclosed herein to provide a list of similar candidate resumes.

RECOMMENDATION PAGE

Once matching profiles are selected, they can be further arranged or categorized in groups to assist the job seeker or job poster in selecting the most appropriate matches.

For example, in one embodiment, to further enhance searching and matching capabilities, job levels 49 may be used to rank, organize or filter the data set search results. For example, upon searching for job postings that match a particular job seeker's resume, the resulting job postings could be presented in groups according to discrete job levels. Similarly, upon searching for resumes that match a particular job posting, the resulting resumes may be presented in groups according to job levels, such as "entry-level," "mid-level," "senior," and "executive." Further, the system may optionally filter out the results to limit the results only to matching job levels. In yet another embodiment, searches may permit a user to specify a particular job level to match the interests of a given job seeker or job poster.

In addition, matching profiles may be organized by "fresh" for more recent postings, "close" for ranking profiles that are located geographically nearby, "region" for ranking profiles by geographical region, or "relevant' for ranking profiles by how closely the match.

In another embodiment, the target profiles can be organized by various topics within the subject profile. In other words, attributes contained in a profile may be identified and grouped together in order to conduct searches that are focused on specific topics. In one embodiment, each attribute in the subject profile is compared to every other attribute in the profile and uses the pods 125 to determine how related (if at all) the two attributes are. Each attribute is then paired with its highest matching other attribute to form "dynamic pods" containing two attributes. To ensure that attributes have some minimum level of relatedness, thresholds can be set. The system then takes another pass comparing each dynamic pod to each other using a lower threshold, and the highest matching dynamic pods are combined to form larger pods. This comparison process continues until an optimum dynamic-pod size is reached. For example, the system can be configured to continue iterations until there is an optimum number of attributes within each dynamic pod (e.g., 4-8) or until there is an optimum number of dynamic pods (e.g., 3-5). In further enhancement, the system may optionally add attributes to the dynamic pods by adding attributes that are highly related based on the pods 125, even where the related attribute is not actually in the profile. This can create more robust results based on the dynamic pods, as will be described next.

Once the dynamic pods are generated, user may seek profiles that match only the attributes captured within the dynamic pod. For example, the dynamic pod may be displayed in a tab on a recommendation page, and by clicking on the tab, the system can fire a new search seeking for profiles matching just the attributes listed in the dynamic pods. This search will generate more focused profile search results.

While specific embodiments of the present invention have been described in detail, it will be appreciated by those skilled in the art that various modifications and alternatives to those details could be developed in light of the overall teachings of the disclosure. For example, the processes described with respect to computer executable instructions can be performed in hardware or software without departing from the spirit of the invention. Furthermore, the order of all steps disclosed in the figures and discussed above has been provided for exemplary purposes only. Therefore, it should be understood by those skilled in the art that these steps may be rearranged and altered without departing from the spirit of the present invention. In addition, it is to be understood that all patents discussed in this document are to be incorporated herein by reference in their entirety. Accordingly, the particular arrangement disclosed is meant to be illustrative only and not limiting as to the scope of the invention which is to be given the full breadth of the appended claims and any equivalents thereof.

What is claimed is:

1. A computerized system for assigning a numeric score to a resume, wherein the numeric score is indicative of the qualifications of the job applicant represented by the resume to perform a job defined by a job description, the system comprising:
    a server for receiving a resume file containing data representing a resume, the server in communication with a conversion engine for converting the resume file into a standardized resume profile wherein the resume is represented by a listing of attributes and each attribute is identified from the data representing the resume, and wherein the listing of the attributes has a rank order based at least partially upon a relationship between each one of the attributes with respect to each of the other attributes within the resume profile;
    a database for storing the standardized resume profile; and
    a processor for accessing the database to retrieve the standardized resume profile and for comparing it to a standardized job profile comprising a rank-ordered listing of attributes representative of a job description and assigning a numeric score to the resume indicative of the qualifications of the job applicant described in the resume to perform the job described in the job description;
    wherein the processor determines the numeric score by:
        (i) identifying matching attributes between the standardized resume profile and the standardized job profile;
        (ii) assigning points to the standardized resume profile for each matching attribute based on the rank order where the matching attribute appears in the listing of attributes of the standardized resume profile;
        (iii) assigning points to the standardized job profile for each matching attribute based on the rank order where the matching attribute appears in the rank-ordered listing of attributes of the standardized job profile; and
        (iv) adding the points assigned to the standardized resume profile and the standardized job profile.

2. The system of claim 1, wherein the number of points assigned to the standard resume profile for a given matching attribute is equal to the total number of attributes within the listing of attributes of the standardized resume profile minus the ranking of the given matching attribute within the listing.

3. The system of claim 1, wherein the number of points assigned to the standard resume profile for a given matching attribute is equal to the square of the difference between the total number of attributes within the listing of attributes of the standardized resume profile and the ranking of the given matching attribute within the listing.

4. The system of claim 1, wherein the processor is configured to group attributes within the listing of attributes of the standardized resume profile into tiers based on their rank order, and wherein the number of points assigned to the standard resume profile for a given matching attribute is dependent on the tier in which a given matched attribute has been grouped.

5. The system of claim 1, wherein the relative ability of a first attribute from among the listing of attributes to accurately characterize the resume is dependent upon the location within the resume at which the first attribute first appears within the resume.

6. The system of claim 1, wherein the relative ability of a first attribute from among the listing of attributes to accurately characterize the resume is dependent upon the number of times that the information represented by the first attribute is repeated within the resume.

7. The system of claim 1, wherein the server receives a second resume file containing data representing a second resume, the server in communication with the conversion engine for converting the second resume file into a second standardized resume profile wherein the second resume is represented by a second listing of attributes and each attribute is identified from the data representing the second resume, and wherein the listing of the attributes a rank order based at least partially on a relationship between each one of the attributes with respect to each of the other attributes within the second standardized resume profile;
    wherein the processor determines a second numeric score for the second resume and generates a recommendation of either the resume or the second resume based on whether the second numeric score is greater or less than the numeric score.

* * * * *